(12) United States Patent
Miyamoto et al.

(10) Patent No.: US 6,637,600 B2
(45) Date of Patent: Oct. 28, 2003

(54) WASTE PLASTICS SEPARATOR

(75) Inventors: Hideyuki Miyamoto, Kawasaki (JP); Nobuo Takasu, Yokohama (JP); Akio Aoki, Yokohama (JP); Keishi Akiu, Yokohama (JP)

(73) Assignee: NKK Corporation, Tokyo (JP)

( * ) Notice: Subject to any disclaimer, the term of this patent is extended or adjusted under 35 U.S.C. 154(b) by 0 days.

(21) Appl. No.: 10/170,719

(22) Filed: Jun. 12, 2002

(65) Prior Publication Data

US 2003/0015461 A1 Jan. 23, 2003

Related U.S. Application Data

(63) Continuation of application No. PCT/JP00/04966, filed on Jul. 26, 2000.

(30) Foreign Application Priority Data

| Dec. 13, 1999 | (JP) | 11-353519 |
| Dec. 17, 1999 | (JP) | 11-358370 |
| May 10, 2000 | (JP) | 2000-136695 |
| May 23, 2000 | (JP) | 2000-150920 |
| Jul. 7, 2000 | (JP) | 2000-206103 |

(51) Int. Cl.$^7$ ................................................. B07C 5/02
(52) U.S. Cl. ....................... 209/539; 209/523; 209/587; 209/644
(58) Field of Search .......................... 209/522, 523, 209/539, 576, 577, 587, 644, 922, 923, 932

(56) References Cited

U.S. PATENT DOCUMENTS

| 5,443,164 A | * | 8/1995 | Walsh et al. ............ 209/587 X |
| 5,655,667 A | * | 8/1997 | Isaacs ........................ 209/539 |
| 5,699,724 A | | 12/1997 | Wettstein et al. |
| 5,733,592 A | | 3/1998 | Wettstein et al. |
| 5,746,323 A | * | 5/1998 | Dragotta ................. 209/644 X |
| 6,076,683 A | * | 6/2000 | Okada et al. ........... 209/577 X |

FOREIGN PATENT DOCUMENTS

| GB | 2 271 846 A | 4/1994 |
| JP | 47-2299 | 1/1972 |
| JP | 6-167323 A | 6/1994 |
| JP | 6-281430 A | 10/1994 |
| JP | 8-1101 A | 1/1996 |
| JP | 9-89768 A | 4/1997 |
| JP | 9-159530 A | 6/1997 |
| JP | 9-220532 A | 8/1997 |
| JP | 10-25019 A | 1/1998 |
| JP | 10-194433 A | 7/1998 |
| JP | 2000-6150 A | 1/2000 |

OTHER PUBLICATIONS

English translation of International Preliminary Examination Report dated Feb. 5, 2002 for International Application No. PCT/JP00/04966 filed Jul. 26, 2000.

* cited by examiner

*Primary Examiner*—Tuan N. Nguyen
(74) *Attorney, Agent, or Firm*—Frishauf, Holtz, Goodman & Chick, P.C.

(57) ABSTRACT

A waste plastics separator is provided which includes a charging device for charging waste plastics; a first alignment device for arranging the waste plastics in a row in the lengthwise direction of the waste plastics; a second alignment device for selecting and discharging waste plastics having not been arranged in the row; a detection device for detecting the waste plastics arranged in the row; a sorting device for sorting the waste plastics; and a sorting control device for controlling sorting work.

1 Claim, 24 Drawing Sheets

WASTE PLASTICS SEPARATOR

This application is a Continuation Application of International Application PCT/JP00/04966, filed Jul. 26, 2000, the entire contents of which are incorporated herein by reference.

FIELD OF THE INVENTION

The present invention relates to a waste plastics separator which sorts plastic bottles and hard plastics having a shape similar to that of plastic bottle such as toys, which are resource refuse, in waste plastics by material and color.

DESCRIPTION OF THE RELATED ARTS

Conventionally, it is well known that the near infrared rays absorption spectrum of plastics is peculiar according to the material thereof. In Europe including environmentally advanced nations, an automatic separator for waste plastic bottles using a measuring device for identifying material by utilizing the near infrared rays absorbing spectrum has been developed formerly and has been brought into commercial production (JP-A-9-220532). In Japan as well, technical development relating to such a technology has been rendered intensively, and some technologies have been published (JP-A-8-1101, JP-A-9-89768, and JP-A-9-220532).

Regarding the speed of measurement of the material of plastics using the near infrared rays absorption spectrum, a technology providing a speed less than 0.01 second per one spot has been developed by means of a spectrophotometry system using a combination of a near infrared spectral element and a one-dimensional solid-state image pickup element capable of being used in a near infrared zone. Also, the measurement of color of plastics has come to be capable of being made in a very short period of time. Therefore, the throughput of an automatic separator for waste plastic bottles etc. depends on the speed at which the plastic bottles etc. that have been charged disorderly are placed in a row.

However, the waste plastic bottles etc. are often pressed and collapsed into a flat shape, and moreover they are light in weight, so that it is very difficult to place them in a row. Therefore, the automatic separator for waste plastic bottles etc. has a problem in that because of the difficulty in placing them in a row, it is difficult to increase the throughput of the system, and also the system is complicate in construction.

SUMMARY OF THE INVENTION

It is an object of the present invention to provide a waste plastics sorting method and a separator that are capable of significantly increasing the efficiency of sorting waste plastics.

To achieve the object, firstly, the present invention provides a waste plastics separator comprising:
 first alignment means for arranging waste plastics in a row in the lengthwise direction of waste plastics;
 charging means for charging the waste plastics into the first alignment means;
 second alignment means for selecting and discharging waste plastics which are not arranged in a row by the first alignment means;
 detection means for detecting the waste plastics arranged in a row by the second alignment means;
 sorting means for sorting the waste plastics arranged in a row by the second alignment means; and
 sorting control means for controlling sorting work performed by the sorting means according to information detected by the detection means.

Secondly, the present invention provides a waste plastics separator comprising:
 a sorting conveyor for conveying waste plastics;
 a material identifying device for identifying the material of waste plastics on the sorting conveyor;
 projected area increasing means for increasing the projected area of waste plastics entering into a material identification range of the material identifying device; and
 delivering means for delivering waste plastics on the sorting conveyor at a predetermined position.

Thirdly, the present invention provides a waste plastics material identifying method comprising the steps of:
 providing an inspection device in a halfway position of a conveying device for plastics;
 eliminating any plastic being conveyed by plastics eliminating means on the upstream side of the inspection device and thereby forming a space in which no plastic exists on the conveying device;
 obtaining a reference value by the inspection device in a space in which no plastic exists;
 obtaining a measured value with a plastic by the inspection device in a space in which a plastic exists; and
 identifying the material of plastic by comparing the measured value with the reference value.

Fourthly, the present invention provides a waste plastics material identifying device comprising:
 a conveying device for plastics;
 an inspection device provided in a halfway position of the conveying device to identify the material of plastics; and
 plastics eliminating means provided on the upstream side of the inspection device in the conveying direction to eliminate any plastic being conveyed from the conveying device, in which any plastic being conveyed is eliminated by plastics eliminating means on the upstream side of the inspection device, and thereby a space in which no plastic exists is formed on the conveying device.

Fifthly, the present invention provides a waste plastics material identifying device comprising:
 a light source for radiating light including near infrared rays;
 a reflecting plate disposed substantially at right angles to the light axis of the light source so as to hold a waste plastic whose material is to be identified between the reflecting plate and the light source, the reflecting surface thereof being formed with irregularities;
 a spectroscope for the spectrometry of near infrared rays which are radiated from the light source and are reflected by the waste plastic or the reflecting plate; and
 an arithmetic unit for determining the material of the waste plastic based on the spectrometry result of the spectroscope.

Sixthly, the present invention provides a sorting device comprising:
 a conveying device for conveying articles by a conveyor;
 a compressed air injection nozzle disposed at the side of the conveying device over the length in the conveying direction of the conveying device to inject compressed air onto an article on the conveyor conveying surface of the conveying device from the side of the conveying device; and
 means for recovering an article which is blown off by the injection.

DESCRIPTION OF THE EMBODIMENT

Preferred Embodiment-1

Figure 1:
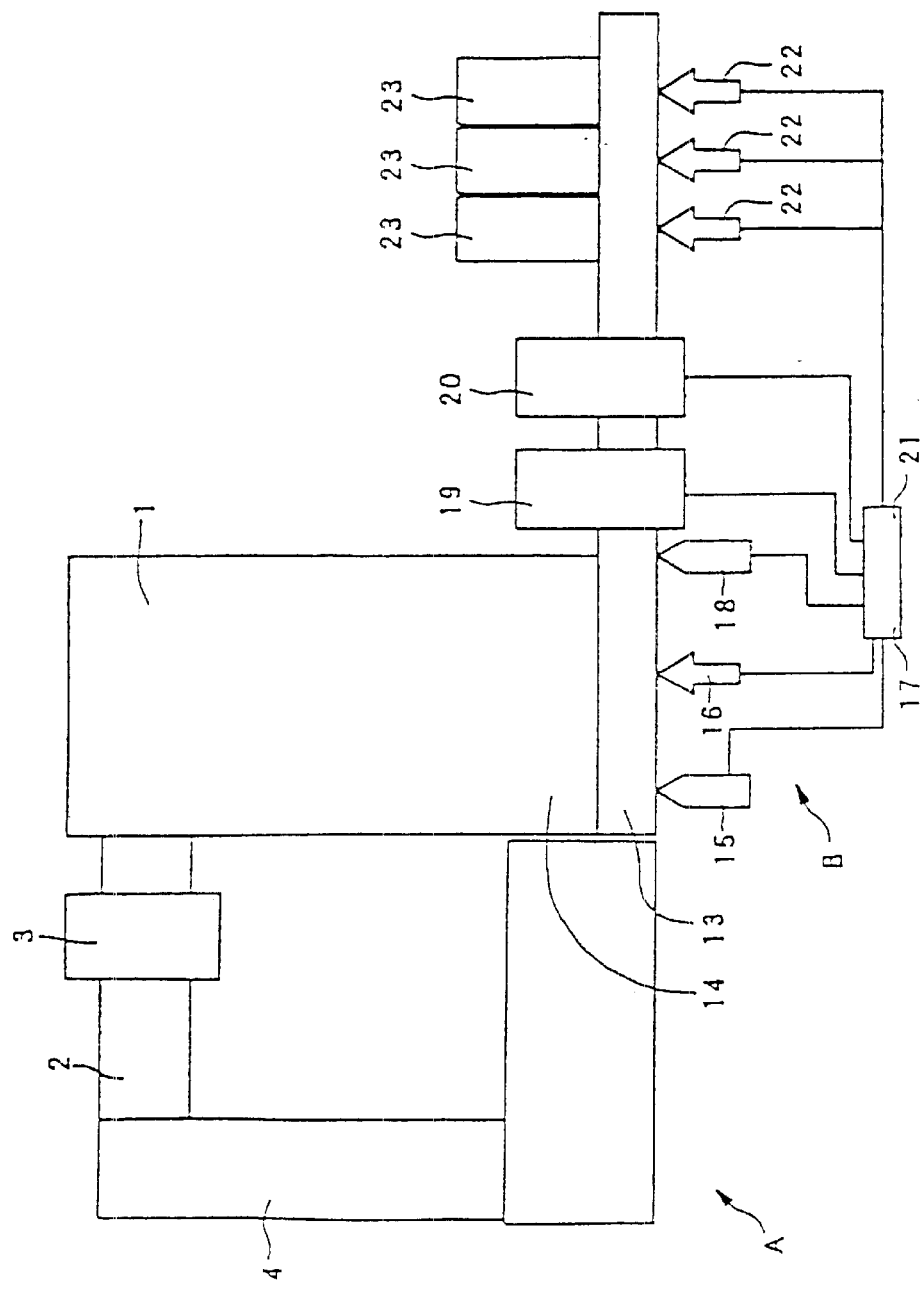
FIG. 1 is an explanatory view for illustrating one example of a waste plastics separator in accordance with preferred embodiment 1.

A first embodiment provides a waste plastics separator having (1) charging means for charging waste plastics into first alignment means, (2) the first alignment means for arranging the waste plastics charged by the charging means in a row in the lengthwise direction of waste plastics, (3) second alignment means for sorting and discharging waste plastics having not been arranged in a row, of the waste plastics aligned by the first alignment means, (4) detection means for detecting the waste plastics arranged in a row by the second alignment means, (5) sorting means for sorting the waste plastics arranged in a row by the second alignment means, and (6) sorting control means for controlling sorting work performed by the sorting means according to information detected by the detection means.

Since the waste plastics separator in accordance with the present invention has the first alignment means and second alignment means as described above, the system achieves an effect that waste plastics can be arranged in a row in the lengthwise direction efficiently, and thus the subsequent sorting work can be performed efficiently.

In the waste plastics separator in accordance with the first embodiment, the first alignment means preferably has a conveying conveyor arranged so as to be tilted in the width direction, a travel guide provided along the lower side of the conveying conveyor tilted in the width direction, and arranging means for arranging waste plastics, which are conveyed on the conveying conveyor, in a row in the lengthwise direction.

By arranging the conveying conveyor so as to be tilted in the width direction as described above, waste plastics charged onto the conveying conveyor by charging means are slid down to the travel guide side provided on the lower side by this tilt. If the travel speeds of the travel guide and the conveying conveyor are made different from each other, the waste plastics coming into contact with the travel guide are aligned in the lengthwise direction. Further, since arranging means for arranging the conveyed waste plastics in a row in the lengthwise direction is provided on the conveying conveyor, waste plastics can be arranged in a row in the lengthwise direction.

In a waste plastics separator in accordance with a second embodiment, the arranging means can be made a cover for covering a conveying conveyer surface in a state in which at least on the downstream side of conveying conveyor, a conveying conveyor surface of a width capable of conveying waste plastics in a row in the lengthwise direction is left.

By providing the cover for covering a conveyer surface in a state in which at least on the downstream side of conveying conveyor, a conveying conveyor surface of a width capable of conveying waste plastics in a row in the lengthwise direction is left as described above, the waste plastics charged on the upstream side of conveying conveyor by the charging means except one row on the lower travel guide siderun on the cover as they are conveyed to the downstream side of conveying conveyor, and does not go ahead farther. Thereby, waste plastics can be arranged in a row.

Further, in a waste plastics separator in accordance with a third embodiment, the first alignment means preferably has a nozzle capable of injecting air from the upper side of the conveying conveyor tilted in the width direction toward the lower travel guide side. By injecting air from the upper side in the width direction of conveying conveyor toward the lower travel guide, waste plastics, which are less liable to slide down to the travel guide side because of flat shape and light weight thereof, can be pushed out to the travel guide side, by which waste plastics can be arranged easily in a row in the lengthwise direction. This configuration is especially effective in moving the waste plastics having run on the cover to the travel guide side.

On the other hand, in the waste plastics separator in accordance with the second embodiment, the arranging means may be a rope-like element which is stretched over the conveying conveyor in the range from a waste plastics charging portion of conveying conveyor onto which waste plastics are charged by the charging means to a side end portion of the second alignment means of conveying conveyor, the rope-like element being arranged so that a clearance between the rope-like element and the travel guide increases in the range from the waste plastics charging portion to the side end portion of the second alignment means.

By arranging the rope-like element so that the clearance between the rope-like element and the travel guide increases in the range from the waste plastics charging portion to the side end portion of the second alignment means as described above, waste plastics are arranged in a row in the lengthwise direction by the operation described below. When waste plastics are charged into the waste plastics charging portion of conveying conveyor, the waste plastics are placed in a row in the lengthwise direction by the operation of conveying conveyor and transfer guide as described above. At this time, when, for example, two waste plastics are charged onto the conveying conveyor at a time, the two waste plastics move in the lengthwise direction while being arranged in parallel. In this case, by arranging the rope-like element, which is arranging means, so as to provide a clearance with a width approximately equal to the width of waste plastic between the rope-like element and the transfer guide, the rope-like element is arranged between the two waste plastics arranged in parallel. If the waste plastics are conveyed by the conveying conveyor in this state, since the clearance between the rope-like element and the transfer guide increases in the range from the waste plastics charging portion to the side end portion of the second alignment means, the outside waste plastic moves in the direction such as to separate gradually from the travel guide, so that the two waste plastics are separated from each other. Thereby, the waste plastics on the travel guide side are arranged in a row in the lengthwise direction.

Further, in a waste plastics separator in accordance with a fifth embodiment, it is preferable that the rope-like element be arranged in the range from a position on the second alignment means side end portion side of a middle position between the waste plastics charging portion and the second alignment means side end portion, and a Y-shaped rope-like element be stretched in the direction so as to be separated from the conveying conveyor.

In the case where the rope-like element is arranged as arranging means, a waste plastic is sometimes conveyed in a state of striding the rope-like element. In such a case, when the waste plastic transfers from the conveying conveyor to the next second alignment means, the waste plastic exhibits an unstable behavior and sometimes disturbs the flow of waste plastics. In this case, by providing the Y-shaped rope-like element, the waste plastic having been conveyed while striding the rope-like element runs on the Y-shaped rope-like element having a tilt in the vertical direction, by which the waste plastic is thrown down to the inside of rope-like element, that is, the travel guide side, or the outside thereof. Therefore, the waste plastic becomes parallel with the travel guide, so that the disturbance of flow of waste plastics can be prevented.

In the waste plastics separator in accordance with any one of the first to sixth embodiments, it is preferable that the second alignment means have a conveying conveyor having a width capable of conveying waste plastics in a row in the lengthwise direction and return conveying means which returns the waste plastics having not been conveyed by the conveying conveyor to the charging means. Since the second alignment means is a conveying conveyor having only a width capable of conveying waste plastics in a row in the lengthwise direction, the waste plastics having not been arranged in a row by the first alignment means cannot run on this conveying conveyor and are therefore selected and discharged compulsorily and returned to the charging means by the return conveying means. Thereby, waste plastics can be arranged in a row more reliably.

Further, in a waste plastics separator in accordance with a seventh embodiment, it is preferable that the second alignment means have a non-alignment sensor for detecting the length of waste plastic and the clearance between waste plastics on the conveying conveyor, discharging means for discharging waste plastics from the conveying conveyor, and discharge control means for controlling the discharge of waste plastics effected by the discharging means based on the information from the non-alignment sensor. In the case where waste plastics are flat in shape, even on a conveying conveyor having a width capable of usually conveying only one row of waste plastics, waste plastics are sometimes conveyed in two tiers. In this case, the length of waste plastic is measured by the non-alignment sensor, and if the measured length is larger than the length of one waste plastic, it is judged that waste plastics are lapped on each other. Thereby, the lapped waste plastics can be discharged by the discharging means.

In the waste plastics separator in accordance with any one of the first to eighth embodiments, the detection means preferably detects the color and/or material of waste plastics. By detecting the material and/or color of waste plastics to perform sorting, the sorted waste plastics can be reused smoothly.

Further, in the waste plastics separator in accordance with any one of the first to ninth embodiments, the charging means preferably has a charging conveyor which is a ledged and inclined conveyor whose conveying speed can be controlled by an external signal and at least one rotary-type rotary leveling machine having an axis parallel with the charging conveyor surface, which is provided over the charging conveyor. By the combination of the ledged and inclined conveyor and the rotary leveling machine as described above, the quantity of waste plastics put in a division formed by the conveyor ledge (hereinafter referred to as a compartment) can be made substantially fixed. Thereby, the quantity of waste plastics sent to the first and second alignment means can be made fixed, so that the capacity of alignment means can be exercised at the maximum. Therefore, the capacity that the waste plastics separator in accordance with the present invention has can be exercised at the maximum.

Also, in the waste plastics separator in accordance with any one of the first to tenth embodiments, a transfer chute capable of charging waste plastics into a predetermined position of the first alignment means is preferably provided between the charging means and the first alignment means.

By providing such a transfer chute, when waste plastics are charged from the charging means into the first alignment means, they are charged into a predetermined position of the first alignment means, so that the waste plastics can be placed easily in a row in the first alignment means.

The following is a detailed description of the present invention. FIG. 1 shows one example of a waste plastics separator in accordance with the present invention. In the present invention, waste plastics are first charged in a hopper 1. The waste plastics in the present invention include plastic bottles and hard plastics having a shape similar to that of plastic bottle such as toys. In particular, waste plastics having a large length with respect to the width are suitable to the separator in accordance with the present invention. Among these, waste plastic bottles, which have been consumed especially in large amounts in recent years, should preferably be handled by this separator because the present invention can be applied more effectively.

The waste plastics charged into the hopper 1 are pulled out of the hopper 1 by a charging conveyor 2, and are leveled by a rotary leveling machine 3 during the conveyance. The leveled waste plastics are pulled out of the charging conveyor 2 and are charged into a first alignment means A through a pull-out conveyor 4. Next, the charging conveyor 2 and the rotary leveling machine 3, which are charging means, will first be described.

Figure 2:
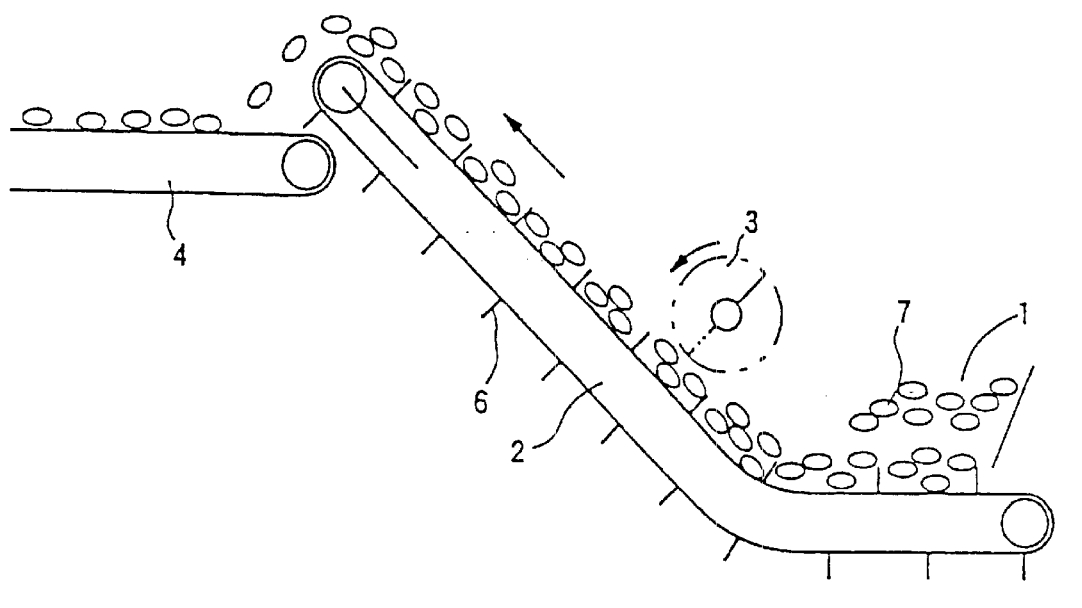
FIG. 2 is an explanatory view for illustrating one example of charging means of a waste plastics separator in accordance with preferred embodiment 1.

FIG. 2 shows one example of the charging conveyor 2 and the rotary leveling machine 3. As shown in FIG. 2, the charging conveyor 2 is provided so as to be inclined slantwise upward from the hopper 1, and is provided with ledges 6 at predetermined intervals. Waste plastics 7 in the hopper 1 are put between the ledges 6 and are moved slantwise upward by the charging conveyor 2. In a halfway position of the charging conveyor 2, at least one rotary leveling machine 3 is provided, so that the quantity of waste plastics in a compartment partitioned by the ledges 6 is made fixed.

Conventionally, there has often been used a method in which a reed screen or a scraping plate is provided on the top surface of a ledged and inclined conveyor such as the charging conveyor 2, by which the conveyed articles put in the compartment are leveled to uniform the quantity of conveyed articles. However, although such a method has few problems and is effective in the case where the conveyed articles have a small and uniform size like powder and particles, the method sometimes presents problems in the case where the conveyed articles have a large size and various shapes like waste plastics in the present invention. When waste plastics are conveyed, there arises a problem in that even if the reed screen or the scraping plate is provided, the quantity per one compartment is not necessarily made fixed, and moreover waste plastics are held between the scraping plate provided on the top surface of conveyor and the conveyor ledge, by which the conveyor is overloaded and stopped. The aforementioned rotary leveling machine 3 solves such a problem.

Specifically, at least one rotary leveling machine having an axis parallel with the charging conveyor is provided and rotated, by which the quantity of waste plastics in the compartment is made substantially fixed, which prevents a trouble such that waste plastics are held between the scraping plate and the ledge and thereby the charging conveyor is stopped.

Figure 3:
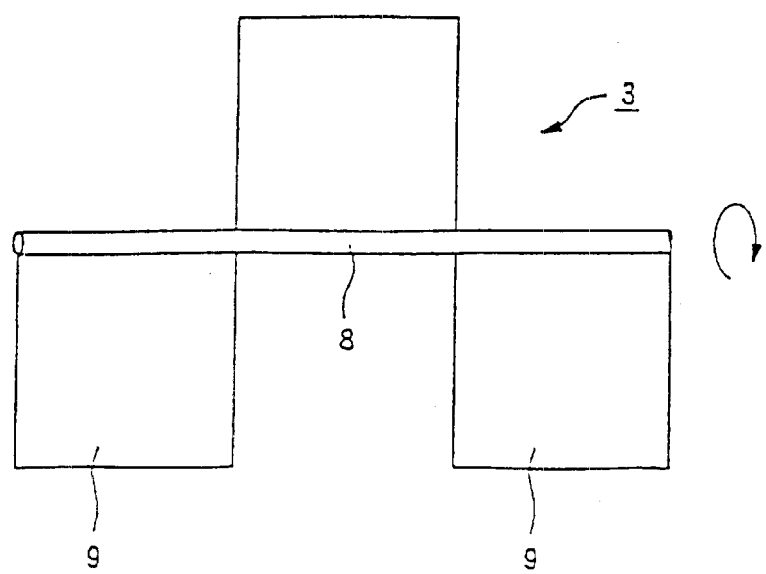
FIG. 3 is a schematic front view showing one example of a rotary leveling machine in accordance with preferred embodiment 1.

One example of the rotary leveling machine 3 is shown in FIG. 3. This rotary leveling machine 3 is constructed so that strip-shaped blades 9 are installed on a rotating shaft 8. In the present invention, the blade 9 is preferably formed of a flexible material such as a resin, for example, an FRP. The rotating shaft 8 of the rotary leveling machine 3 is arranged in parallel with the charging conveyor 2, and also is arranged so that the tip end of the blade 9 comes almost in contact with the tip end of the ledge 6.

As shown in FIG. 2, the waste plastics 7 charged into the hopper 1 are pulled up and conveyed upward by the ledge 6 of the charging conveyor 2. At this time, the waste plastics 7 are put between the ledges 6 in a heaped-up state. The heaped-up waste plastics 7 can be leveled into a plane connecting the top ends of the ledges 6 by rotating the rotary leveling machine 3 provided over the charging conveyor 2 in the direction such as to scrape down the heaped-up waste plastics. Thereby, the waste plastics 7 can be put in the compartment between the ledges 6 substantially uniformly.

Furthermore, in order to always supply waste plastics matching with the capacity of the first and second alignment means, described later, in proper quantities, the charging conveyor 2 is constructed so that the speed thereof can be controlled by an external signal. As the signal, for example, the quantity of conveyed waste plastics per unit hour detected by the non-alignment sensor provided in the later-described second alignment means can be used. By controlling the speed of charging conveyor by means of the external signal corresponding to the state of the alignment means as described above, the quantity of waste plastics supplied to the alignment means is always proper, so that the waste plastics can be arranged smoothly by the alignment means. Thereby, not only the speed of sorting of waste plastics is increased significantly but also the lapping of waste plastics on each other is decreased, thereby improving the accuracy of final sorting.

The waste plastics 7 having been conveyed by the charging conveyor 2 as described above are charged onto the conveying conveyor and travel guide, which are the first alignment means A, through the pull-out conveyor 4 as shown in FIG. 1. Next, the first alignment means A will be described with reference to FIGS. 4 to 6.

The waste plastics 7 having been conveyed by the pull-out conveyor 4 are charged onto a conveying conveyor 5. This conveying conveyor 5 is provided so as to be tilted in the width direction. On the lower side of the conveying conveyor 5 tilted in the width direction, there is disposed a travel guide 10 provided along the lower side substantially at right angles to the conveying conveyor 5.

Figure 4:
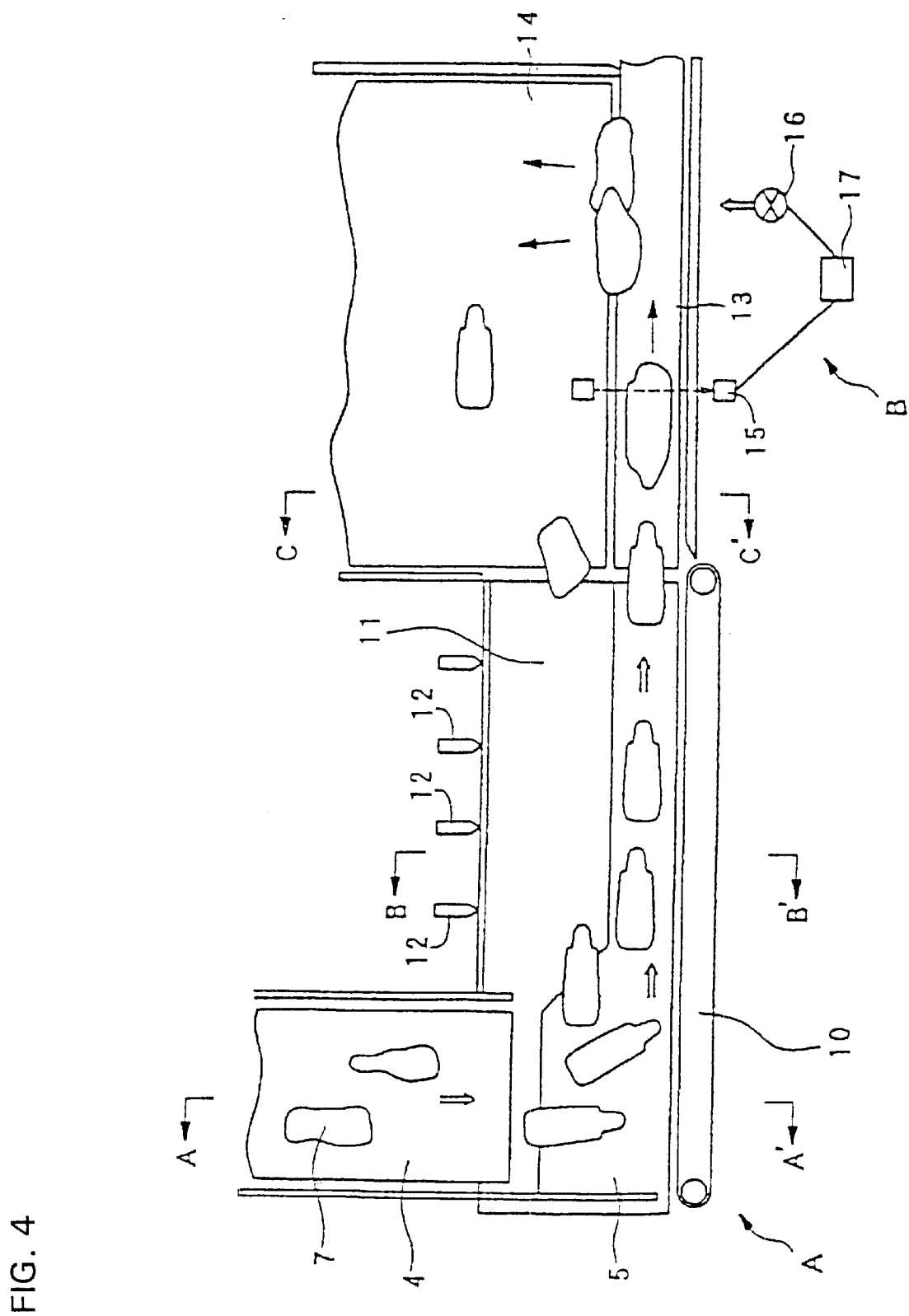
FIG. 4 is a schematic plan view showing first alignment means and second alignment means of a waste plastics separator in accordance with preferred embodiment 1.
Figure 5:
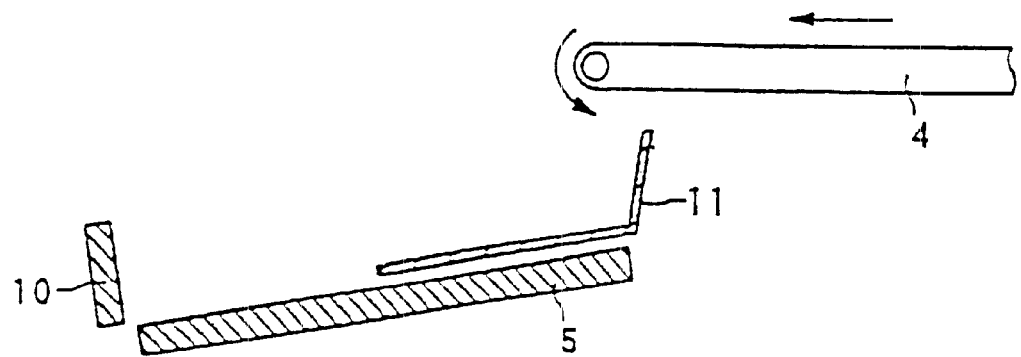
FIG. 5 is a schematic sectional view taken along the line A–A' of FIG. 4.
Figure 6:
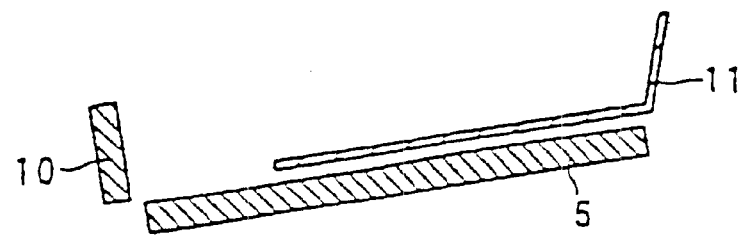
FIG. 6 is a schematic sectional view taken along the line B–B' of FIG. 4.

In the first alignment means A in this example, the conveying conveyor 5, the travel guide 10, and arranging means that arranges the waste plastics conveyed on the conveying conveyor 5 in a row in the lengthwise direction constitute the first alignment means. In the example shown in FIGS. 4 to 6, the arranging means is configured, for example, as shown in FIG. 4, so as to have a cover 11 for covering the surface of the conveying conveyer in a state in which at least on the downstream side of the conveying conveyor 5, a surface of the conveying conveyor 5 of a width capable of conveying waste plastics in a row in the lengthwise direction is left. As is apparent from FIGS. 5 and 6, the cover 11, which is the arranging means, covers a part of the upper side of the conveying conveyor 5 on the upstream side, that is, on the pull-out conveyor side, and the area covered by the cover 11 increases toward the downstream side, and finally, as shown in FIGS. 4 and 6, the cover 11 covers the whole surface of the upper side with a surface of the conveying conveyor 5 of a width capable of conveying the waste plastics 7 in a row in the lengthwise direction being left.

As shown in FIG. 4, on the upper side of the conveying conveyor 5, there are arranged air nozzles 12 capable of injecting air to the travel guide side in parallel with the surface of the conveying conveyor 5. Although the air nozzles 12 are preferably provided over the total length of the conveying conveyor 5, a plurality of air nozzles may be provided at intervals for the reason of decreased air consumption.

Next, the alignment of waste plastics by using the first alignment means described above will be described. The waste plastics 7 having been charged from the pull-out conveyor 4 onto the conveying conveyor 5 fall down to the lower side, that is, the travel guide side because the conveying conveyor 5 is tilted in the width direction. Thus, the waste plastics 7 come into contact with the travel guide 10 provided on the lower side of the conveying conveyor 5. Since the travel guide 10 is moved at a speed equal to or higher than the speed of the conveying conveyor 5, the waste plastics 7 coming into contact with the travel guide 10 are arranged in the same direction as that of the travel guide 10, that is, the lengthwise direction of the waste plastics 7.

In the case where a plurality of waste plastics are charged at this time, the waste plastics 7 are placed in a plurality of rows and begin to move in the conveyance direction. However, since on the downstream side, the cover 11 is provided so as to cover the whole of the upper side with a surface of the conveying conveyor 5 of a width capable of conveying the waste plastics 7 in a row in the lengthwise direction being left, rows on the upper side other than one row disposed along the travel guide 10 come into contact with or run on the cover 11, which acts as a brake on the conveyance, and thus the conveying power decreases. Therefore, only one row being in contact with the travel guide 10 advances, and other waste plastics 7 fall in an emptied space in the row being in contact with the travel guide 10 and are conveyed.

Also, in the case where the waste plastics 7 have a flat shape, sometimes they do not slide down properly on the conveying conveyor 5, or remain on the cover 11. Further, the flat-shaped waste plastics 7 sometimes cannot become parallel along the travel guide 10, therefore being conveyed in an oblique posture. In such a case, air is injected from the air nozzles 12 provided on the upper side of the conveying conveyor 5 at right angles to the advance direction of the conveying conveyor 5, by which the waste plastics can be slid toward the travel guide 10, or can be made parallel with the travel guide 10.

Figure 7:
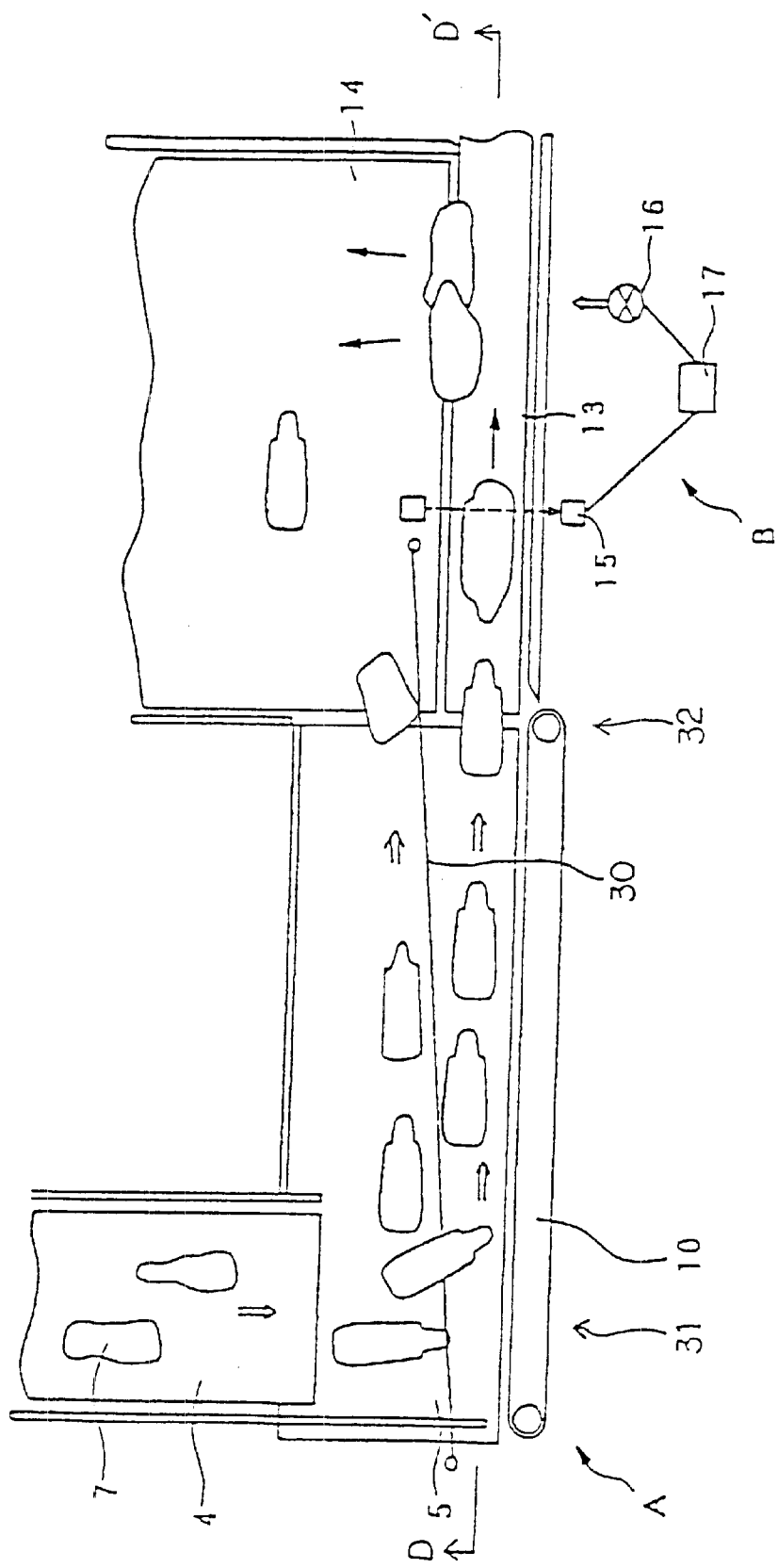
FIG. 7 is a schematic plan view showing another example of a waste plastics separator in accordance with preferred embodiment 1.

Next, another example of arranging means constituting the first alignment means A will be described with reference to FIG. 7. In this example, a rope-like element 30 is provided as the arranging means. As shown in FIG. 7, the rope-like element 30 is provided at least between a waste plastics charging portion 31 into which the waste plastics 7 are charged and a second alignment means side end portion 32 of the conveying conveyor 5.

The material of the rope-like element 30 is not subject to any special restriction, and the rope-like element 30 may be of a rope-shaped material with low skin friction resistance. For example, a rope, wire, chain, or the like can be used. The rope-like element used in the present invention is preferably a rope or the like having flexibility. However, for example, a rod-like element or the like having no flexibility can also be used.

The clearance between the travel guide 10 and the rope-like element 30 in the waste plastics charging portion 31 preferably has a width capable of arranging the waste plastics 7 in a row in the lengthwise direction in the waste plastics charging portion 31 when the waste plastics 7 are charged from the pull-out conveyor 4. By providing the clearance with such a width, the waste plastics 7 can be arranged in a row in the lengthwise direction between the rope-like element 30 and the travel guide 10. Specifically, by providing the clearance between the rope-like element 30 and the travel guide 10 in the waste plastics charging portion 31 with a width capable of arranging the waste plastics 7 in a row, even if a plurality of waste plastics 7 are charged at the same time from the pull-out conveyor 4, only one of these waste plastics is inserted between the rope-like element 30 and the travel guide 10, so that other waste plastics are arranged on the outside of the rope-like element 30, that is, in a position on the side opposite to the travel guide 10 of the rope-like element 30. As shown in FIG. 7, the rope-like element 30 is arranged so as to be inclined in the direction such that the clearance between the rope-like element 30 and the travel guide 10 increases from the waste plastics charging portion 31 toward the second alignment means side end portion 32. Therefore, the waste plastics 7 charged to the outside of the rope-like element 30 separate gradually from the travel guide 10 as they are conveyed by the conveying conveyor 5. On the other hand, the waste plastics 7 charged between the rope-like element 30 and the travel guide 10 are conveyed on the conveying conveyor 5 along the travel guide 10. Only the waste plastics that are positioned between the rope-like element 30 and the travel guide 10 and arranged in a row in the lengthwise direction are transferred onto the second alignment means, for example, a conveying conveyor 13, described later, and other waste plastics charged to the outside of the rope-like element 30 are returned to the hopper 1 by using, for example, a return conveying means 14, described later. Thereby, only the waste plastics arranged in a row in the lengthwise direction can be delivered to the second alignment means.

The width of clearance between the rope-like element 30 and the travel guide 10 in the waste plastics charging portion 31 can be approximately equal to the maximum width of the waste plastics 7 as described above, and is different according to the type of waste plastics 7 to be sorted. For example, in the case where the waste plastic 7 is a plastic bottle, the width is in the range of 60 to 90 mm. On the other hand, the width of clearance between the rope-like element 30 and the travel guide 10 in the second alignment means side end portion 32 is not subject to any special restriction if the width is such as to be capable of separating the waste plastics 7 that are arranged in a row and conveyed along the travel guide 10 from the waste plastics 7 conveyed on the outside of the rope-like element 30 by means of the second alignment means. Specifically, if the second alignment means is a conveying conveyor 13 capable of conveying only one row of the waste plastics 7 as described later, the width of clearance between the rope-like element 30 and the travel guide 10 in the second alignment means side end portion 32 can be a width equal to the width of the conveying conveyor 13 plus 20 to 50 mm. For example, in the case where the waste plastic 7 is a plastic bottle, since the width of the conveying conveyor 13 is generally about 90 mm, the width of clearance can be in the range of 110 to 140 mm.

The waste plastics charging portion 31 usually has a predetermined width, and the waste plastics charging portion in the present invention means any position in this width. Therefore, in the case where regarding the waste plastics charging portion 31, when the range of numerical value is specified as in the case of the width of clearance between the rope-like element 30 and the travel guide 10 described above, the value may be regarded as that in the numerical value range in any position of the waste plastics charging portion.

Figure 8:
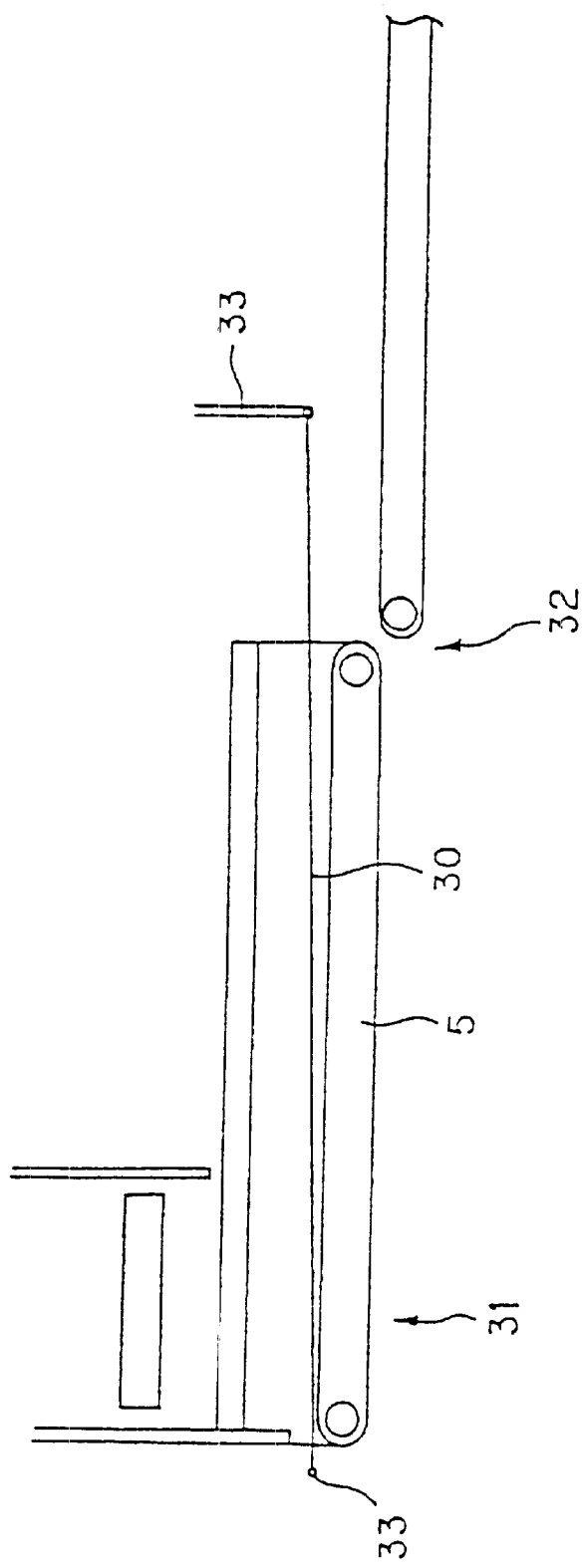
FIG. 8 is a schematic sectional view taken along the line D–D' of FIG. 7.

The clearance between the rope-like element 30 and the conveying conveyor 5 will be explained with reference to FIG. 8 which is a sectional view taken along the line D–D' of FIG. 7. In a portion corresponding to the waste plastics charging portion 31 of the rope-like element 30, the clearance between the rope-like element 30 and the conveying conveyor 5 is not subject to any special restriction if the clearance has a distance such that the rope-like element 30 is not in contact with the conveying conveyor 5 and a height such that the waste plastics 7 get over the rope-like element 30 and move between the travel guide side and the outside. Specifically, the clearance is 20 mm or smaller, and is preferably in the range of 10 to 20 mm. On the other hand, in the second alignment means side end portion 32, the clearance can be provided with a height such that the waste plastics 7 cannot move between the travel guide side of the rope-like element 30 and the outside of the rope-like element 30 by getting over the rope-like element 30 or by passing through the clearance between the rope-like element 30 and the conveying conveyor 5. Specifically, in the case where the waste plastic 7 is a plastic bottle, the clearance is preferably in the range of 40 to 60 mm, which is smaller than the diameter of a 350 ml plastic bottle of 80 mm, the 350 ml plastic bottle being a typical small plastic bottle.

As described above, the rope-like element 30 may be arranged at least between the waste plastics charging portion 31 of the conveying conveyor 5 and the second alignment means side end portion 32. Generally, the rope-like element 30 is often arranged between rope-like element fixers 33 provided on the outsides of the waste plastics charging portion 31 and the second alignment means side end portion 32.

Figure 9:
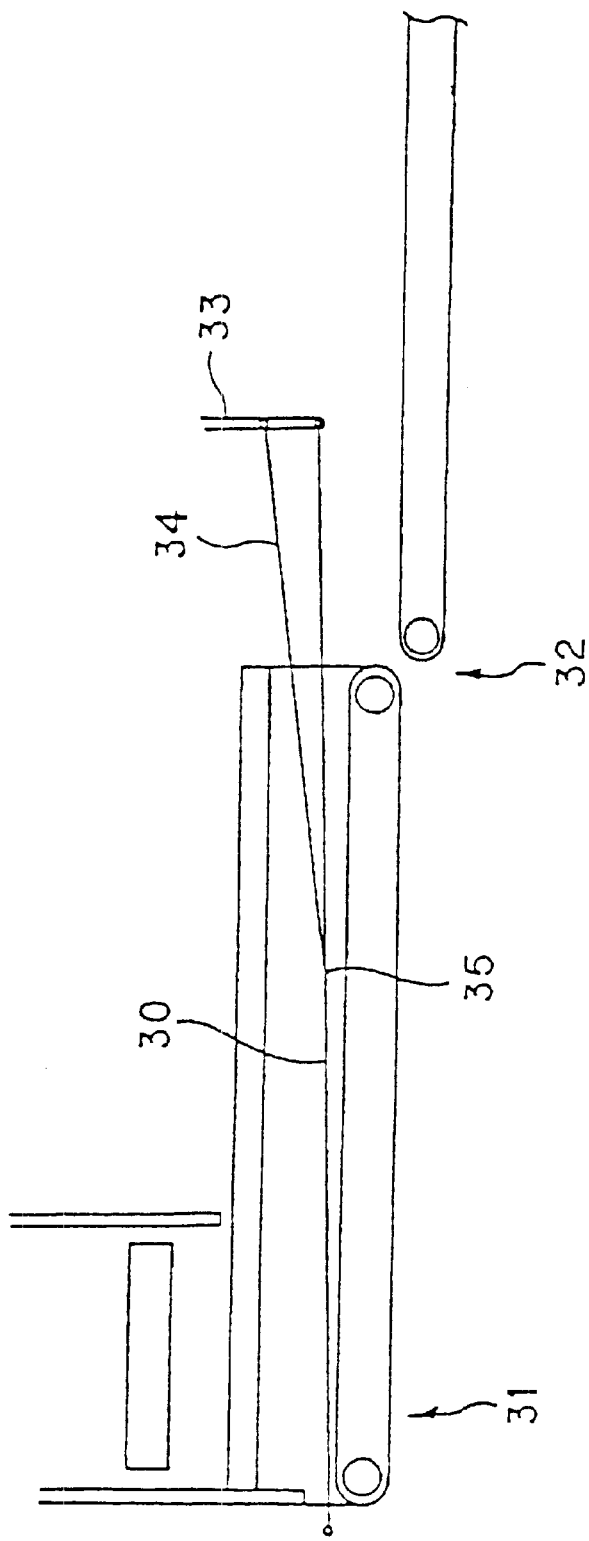
FIG. 9 is a schematic sectional view showing still another example of a waste plastics separator in accordance with preferred embodiment 1.

In the present invention, in the case where a rope-like element is used as the arranging means, it is preferable that the Y-shaped rope-like element be further used. This Y-shaped rope-like element will be explained with reference to FIG. 9. A Y-shaped rope-like element 34 is arranged in the range from a connecting portion 35, which is a portion close to the second alignment means side end portion 32 from a middle portion of the rope-like element 30, that is, a middle portion between the waste plastics charging portion 31 and the second alignment means side end portion 32. This Y-shaped rope-like element 34 is arranged in the direction such as to separate from the conveying conveyor 5, that is, in the direction such as to separate in the vertical direction in the range from the connecting portion 35 to the second alignment means side end portion 32.

By arranging the above-described Y-shaped rope-like element 34, in the case where the waste plastic 7 is, for example, a flattened plastic bottle, sometimes the waste plastic 7 is not positioned in parallel with the travel guide 10, but is positioned obliquely so as to stride the rope-like element 30. If such a waste plastic 7 is conveyed as it is and is transferred to the second alignment means, it exhibits an unstable behavior, and in some cases, undesirably makes the flow of other waste plastics 7 unstable. If the Y-shaped rope-like element 34 is arranged, when the waste plastic 7 having been conveyed in the state of striding the rope-like element 30 is conveyed beyond the connecting portion 35, as the conveyance proceeds, the waste plastic 7 runs on the Y-shaped rope-like element 34, so that the distance from the conveying conveyor 5 increases. Therefore, the waste plastic 7 is brought down to the inside of the rope-like element 30, that is, the travel guide side, or the outside of the rope-like element 30, which offers an advantage that the waste plastics 7 can be selected efficiently without disturbing the above-described flow of the waste plastics 7.

As the Y-shaped rope-like element 34, any rope-shaped material with low friction resistance can be used like the rope-like element 30. Specifically, a rope, wire, chain, and the like can be cited. The position of the connecting portion 35 is not subject to any special restriction if it is a position close to the second alignment means side end portion 32 from the middle portion of the rope-like element 30. Generally, the position of the connecting portion 35 may be at a distance in the range from one-third to a half of the length of the conveying conveyor 5 from the second alignment means side end portion 32. Specifically, the distance is in the range of 800 to 1200 mm from the second alignment means side end portion 32. Also, the distance of the Y-shaped rope-like element 34 from the conveying conveyor 5 in the second alignment means side end portion 32 is preferably about 200 to 300 mm depending on the size of the waste plastics being conveyed in the case where the waste plastic 7 is a plastic bottle.

Although being not subject to any special restriction, the Y-shaped rope-like element 34 may be stretched between the connecting portion 35 and the rope-like element fixer 33 on the second alignment means side end portion side of the rope-like element 30.

Thus, the waste plastics 7 arranged in a row by the first alignment means A are further arranged by the second alignment means B as shown in FIG. 1. The second alignment means B will be explained with reference to FIGS. 4, 7 and 10.

Figure 10:
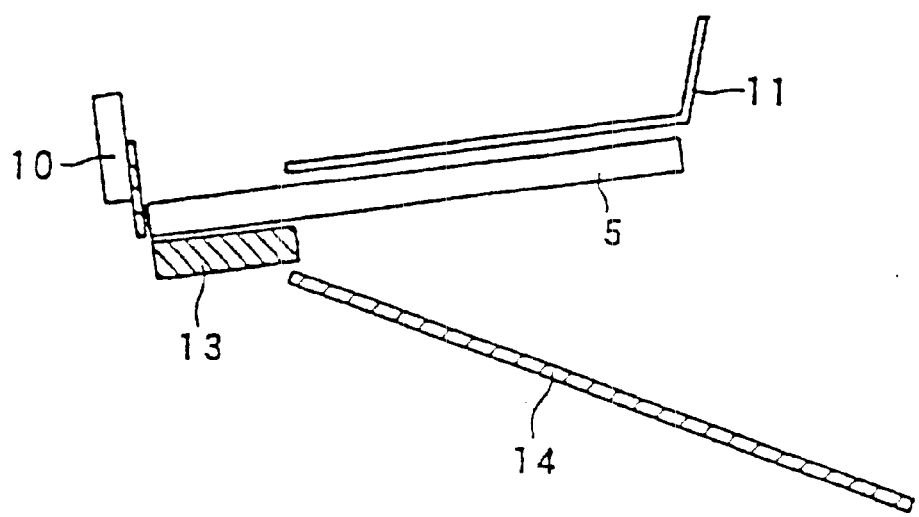
FIG. 10 is a schematic sectional view taken along the line C–C' of FIG. 4.

As shown in FIGS. 4 and 7, the second alignment means B is made up of the conveying conveyor 13, the return conveying means 14, a non-alignment sensor 15, discharging means 16, and discharge control means 17. The conveying conveyor 13 has a width capable of conveying the waste plastics 7 in a row in the lengthwise direction, and is arranged so as to match with a portion corresponding to the portion that is not covered by the cover 11 of the conveying conveyor 5 of the first alignment means as shown in FIG. 10 when the arranging means is the cover 11. Generally, the width of the conveying conveyor 13 is slightly wider than the width of the waste plastics 7 to be sorted. The return conveying means 14 serves to return waste plastics 7 having not been conveyed by the conveying conveyor 13 to the hopper 1. The return conveying means 14 is formed of a plate-shaped member inclined toward the hopper 1 in FIG. 10. In a halfway position of the conveying conveyor 13, the non-alignment sensor 15 is disposed. The information obtained by this non-alignment sensor 15 is sent to the discharge control means 17, and the discharge means 16 is controlled by the discharge control means 17.

Next, the waste plastics aligning operation performed by the above-described second alignment means B will be explained. The waste plastics 7 having been arranged in a row on the travel guide side by the arranging means of the first alignment means A are conveyed as they are by the conveying conveyor 13. However, the flat-shaped waste plastics 7 are entangled with each other and are sometimes conveyed on the conveying conveyor 5 in a plurality of rows as they are. In such a case, when the waste plastics 7 are transferred from the conveying conveyor 5 to the conveying conveyor 13, since the conveying conveyor 13 has only the width capable of conveying the waste plastics 7 in a row in the lengthwise direction, the waste plastics 7 other than one row on the travel guide side cannot ride on the conveying conveyor 13 and fall down, being returned to the hopper 1 by the return conveying means 14.

Also, the waste plastics 7 conveyed in a row as well are sometimes lapped on each other and conveyed on the conveying conveyor 13 in the lapped state because the shape thereof is flat. In such a case, since two waste plastics are lapped on each other, the apparent length is usually large. The non-alignment sensor 15 detects an abnormally large apparent length and a too small clearance between the waste plastics 7 to perform the later-described sorting operation, and sends the information to the discharge control means 17. The discharge control means 17 operates the discharging means consisting of an air valve etc. based on this information to discharge the above-described lapped waste plastics 7 and the waste plastics 7 having a small clearance from the conveying conveyor 16 and to return them to the hopper 1 by using the return conveying means 14. Thus, the waste plastics 7 can be arranged by the second alignment means B so that the lapped waste plastics 7 and the waste plastics 7 having a small clearance are excluded.

Thereupon, the waste plastics 7 can be conveyed to sorting means at the later stage one after another at a high speed regardless of the shape thereof by the first alignment means A and the second alignment means B.

For the waste plastics 7 having been arranged by the first alignment means A and the second alignment means B, the passage thereof is detected by a timing sensor 18 as shown in FIG. 1, and the color and material are detected by a color identification sensor 19 and a material identification sensor 20 disposed at already known distances from the timing sensor 18. These pieces of information are sent to sorting control means 21, and the waste plastics 7 are sorted into sorting boxes 23 by color and material by using sorting means 22 such as an air jet.

In the present invention, as the timing sensor 18, the color identification sensor 19, and the material identification sensor 20, the conventionally known sensors can be used. For example, sensors described in JP-A-5-126761, JP-A-6-308022, etc. can be used.

In the above-described waste plastics separator in accordance with the present invention, it is preferable that the transfer chute be provided between the charging means and the first alignment means, that is, between the pull-out conveyor 4 and the first alignment means A in the example shown in FIG. 1. This transfer chute will be explained with reference to FIG. 11.

Figure 11:
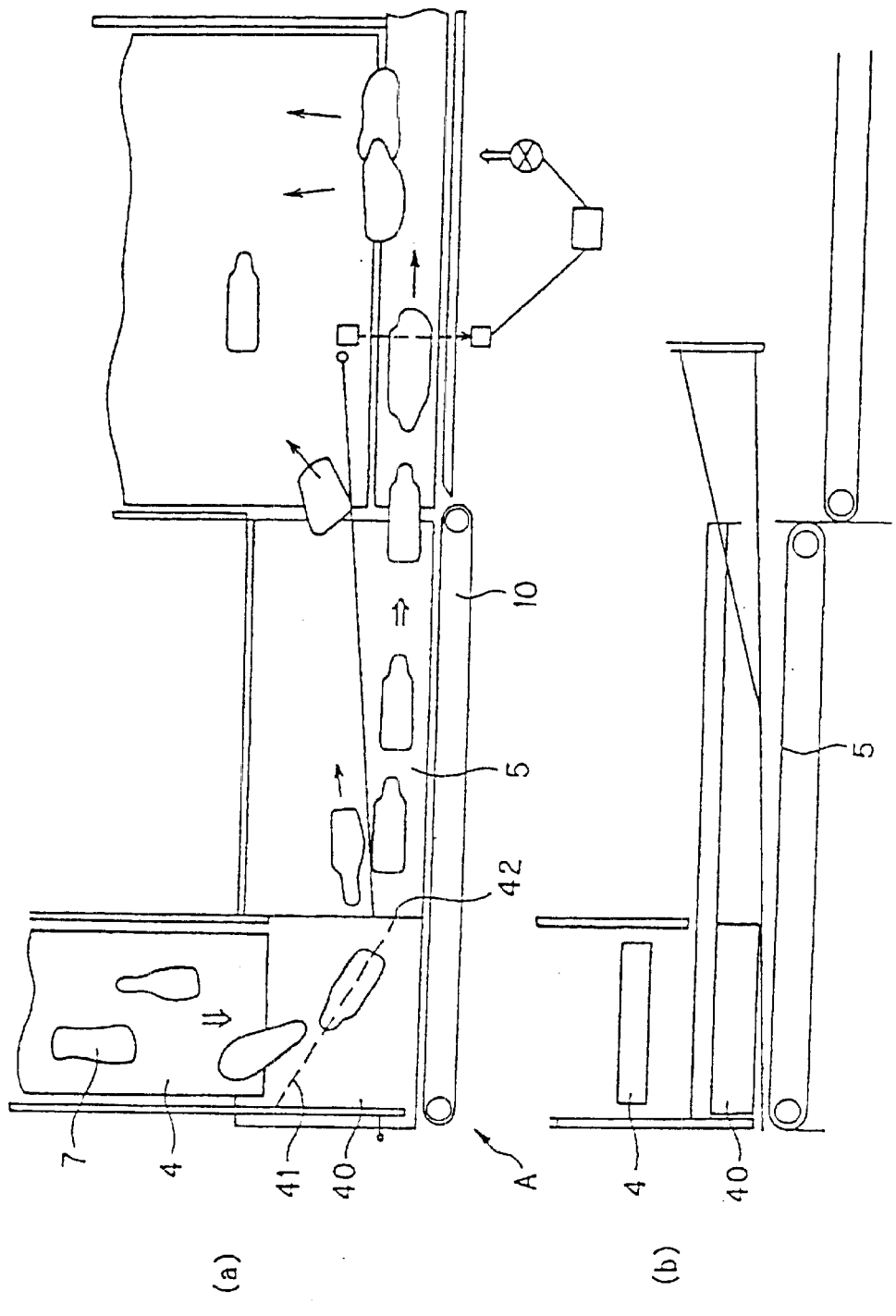
FIG. 11(a) is a schematic plan view for illustrating a transfer chute used in preferred embodiment 1.
FIG. 11(b) is a schematic sectional view for illustrating a transfer chute used in preferred embodiment 1.

As shown in FIG. 11, the transfer chute is configured so that when the waste plastics 7 having been conveyed on the pull-out conveyor 4 are charged onto the conveying conveyor 5 of the first alignment means A, the waste plastics 7 are charged from the pull-out conveyor 4 onto a transfer chute 40, and the charging position of the waste plastics 7 onto the conveying conveyor 5 is regulated on the transfer chute 40, by which the waste plastics 7 can be charged in a predetermined position on the conveying conveyor 5.

As an example of a specific shape of the transfer chute 40, an example can be shown in which as shown in FIG. 11(a), a valley portion 41 having a downward inclination toward the conveying conveyor 5 is provided in the central portion of the plate-shaped transfer chute 40, and a conveying conveyor side end portion 42 of the valley portion 41 is arranged so as to be positioned on the travel guide side of the conveying conveyor 5. This downward inclination is preferably 30 degrees or larger. As shown in FIG. 11(b), the transfer chute is arranged in a position lower than the pull-out conveyor 4 and higher than the conveying conveyer 5.

In the case where the above-described transfer chute 40 is provided, the waste plastics having been conveyed on the pull-out convey or 4 are first charged onto the transfer chute 40. The waste plastics 7 charged onto the transfer chute 40 slide down along the valley portion 41, and are charged from the conveying conveyor side end portion 42 of the valley portion 41 to a position on the travel guide side of the conveying conveyor 5.

By charging the waste plastics 7 onto the conveying conveyor 5 by using the transfer chute 40 as described above, a possibility that a plurality of waste plastics are charged at the same time onto the conveying conveyor 5 is lessened. Also, since the waste plastics can be charged to a position on the travel guide side, the waste plastics can easily be arranged in a row in the lengthwise direction in the position on the travel guide side on the conveying conveyor 5.

The present invention is not limited to the above-described embodiments. The above-described embodiments are typical ones, and any waste plastics separators that have substantially the same configuration as the technical concept described in the claims of the present invention and achieve the same operation and effects are embraced in the technical scope of the present invention.

For example, although the detection means consists of the color identification sensor and the material identification sensor in the explanation of the above embodiments, the present invention is not limited to this detection means. For example, the detection means may consist of the color identification sensor only, or may consist of the material identification sensor only. Further, steel cans and aluminum cans are mixed with the waste plastics in some cases. In the case where it is necessary to sort these wastes, a metal sensor can further be added.

Also, although the sorting means consists of an air jet in the above explanation, the present invention is not limited to this sorting means. For example, a mechanical sorting device such as a lever may be used.

Further, although an example in which the arranging means consists of the rope-like element 30 is shown in FIG. 11 which is used for the explanation of the transfer chute 40, the present invention is not limited to this arranging means. For example, the arranging means may be another means, for example, the cover 11.

Preferred Embodiment 2

Preferred embodiment 2 provides a waste plastics separator comprising:

a sorting conveyor for conveying waste plastics;

a material identifying device for identifying the material of waste plastics on the sorting conveyor;

projected area increasing means for increasing the projected area of waste plastics entering into a material identification range of the material identifying device; and delivering means for delivering waste plastics on the sorting conveyor at a predetermined position.

Embodiments of the present invention will now be described with reference to the accompanying drawings.

Figure 12:
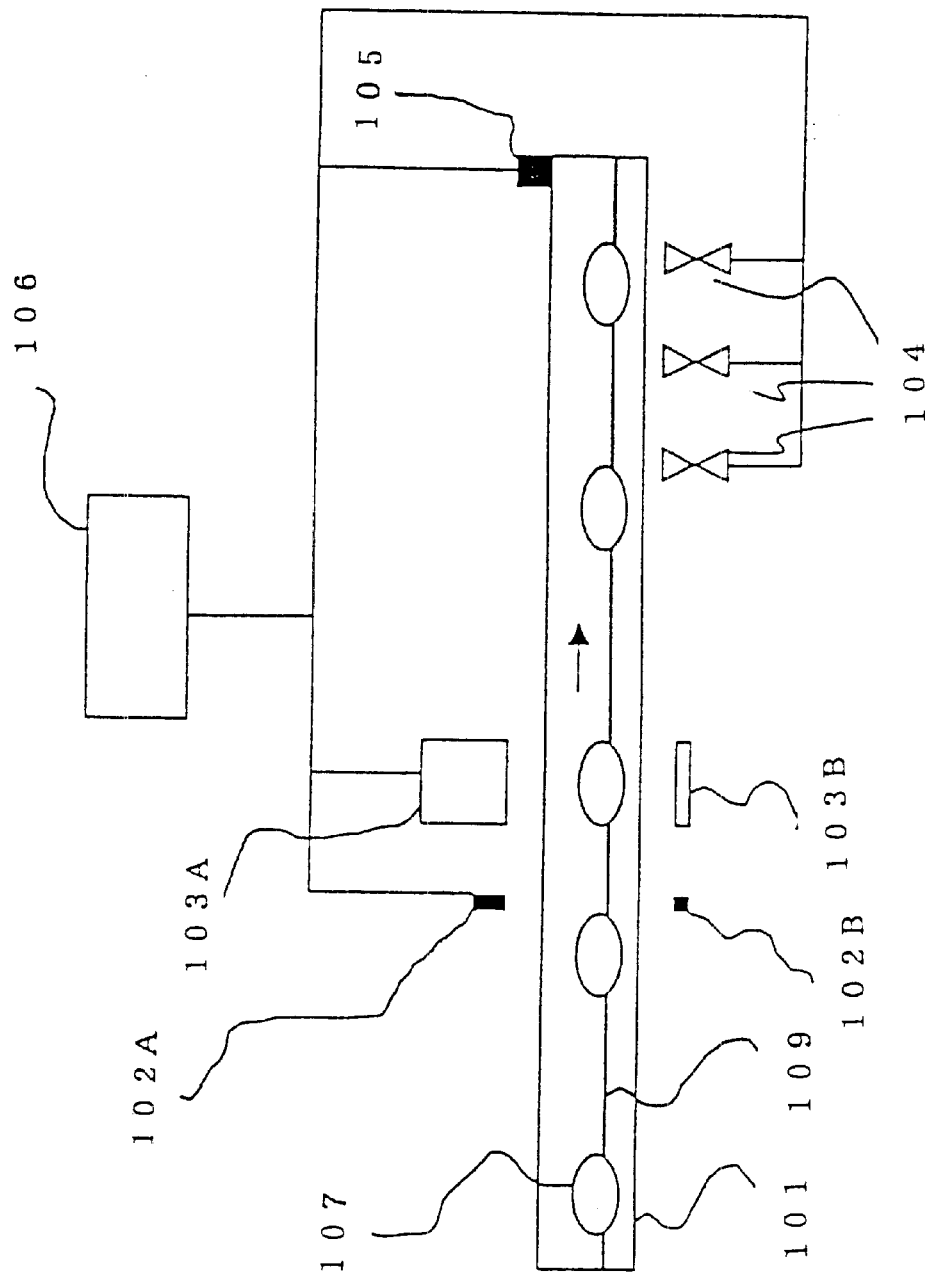
FIG. 12 is a planar configuration view for illustrating a waste plastics separator in accordance with preferred embodiment 2.

FIG. 12 is a planar configuration view for illustrating a first embodiment of the present invention. In FIG. 12, reference numeral 101 denotes a sorting conveyor, 102 denotes a passage sensor (102A and 102B denote a sensor body and a reflecting plate, respectively), 103 denotes a material identifying device (103A and 103B denote a device body and a reflecting plate, respectively), 104 denotes an air nozzle, 105 denotes an encoder, 106 denotes a control unit, 107 denotes waste plastic, and 109 denotes a longitudinal ledge. Referring to FIG. 12, the waste plastics 107 having been separated from one another by an arranging device, not shown, provided on the upstream side and transferred to the sorting conveyor 101 are detected by the passage sensor 102. An output signal from the passage sensor 102 is sent to the control unit 106, and the control unit 106 monitors an output from the encoder 105, and thereby sends a trigger signal to the material identifying device 103 at the time when the waste plastic 107 reaches the identification range of the material identifying device 103. The material identifying device 103 identifies the material of waste plastic according to the timing of trigger signal, and sends the identification result to the control unit 106. In order to discharge the waste plastic to a predetermined discharge position according to the identification result, the control unit 106 operates an electromagnetic valve of the predetermined air nozzle while monitoring the output of the encoder 105, and injects compressed air to discharge the waste plastic.

Figure 13:
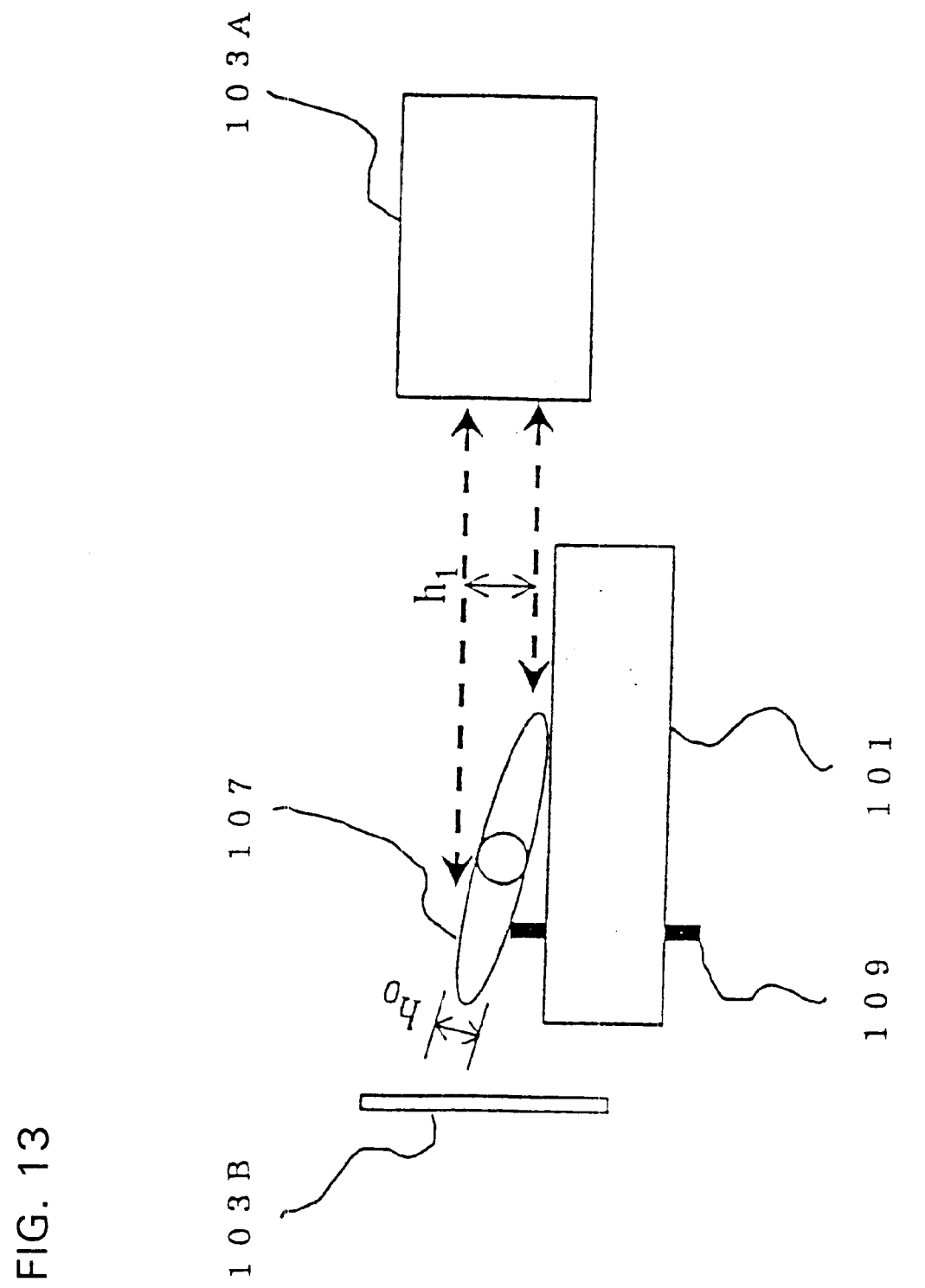
FIG. 13 is a view showing a state in which material is identified in preferred embodiment 2.

FIG. 13 is a front view for illustrating a state of identifying the material of the waste plastic 107 using the sorting conveyor 101 provided with the longitudinal ledge 109. Even for the waste plastic 107 deformed into a flat shape having a thickness $h_0$, the projected area of the waste plastic 107 viewed from the material identifying device 103 is large because the waste plastic 107 is raised on one side by the longitudinal ledge 109. As a result, even for the waste plastic 107 that has conventionally been incapable of being identified accurately because of deformation into a flat shape and the resultant decrease in projected area, the material thereof can be identified with high accuracy.

Figure 14:
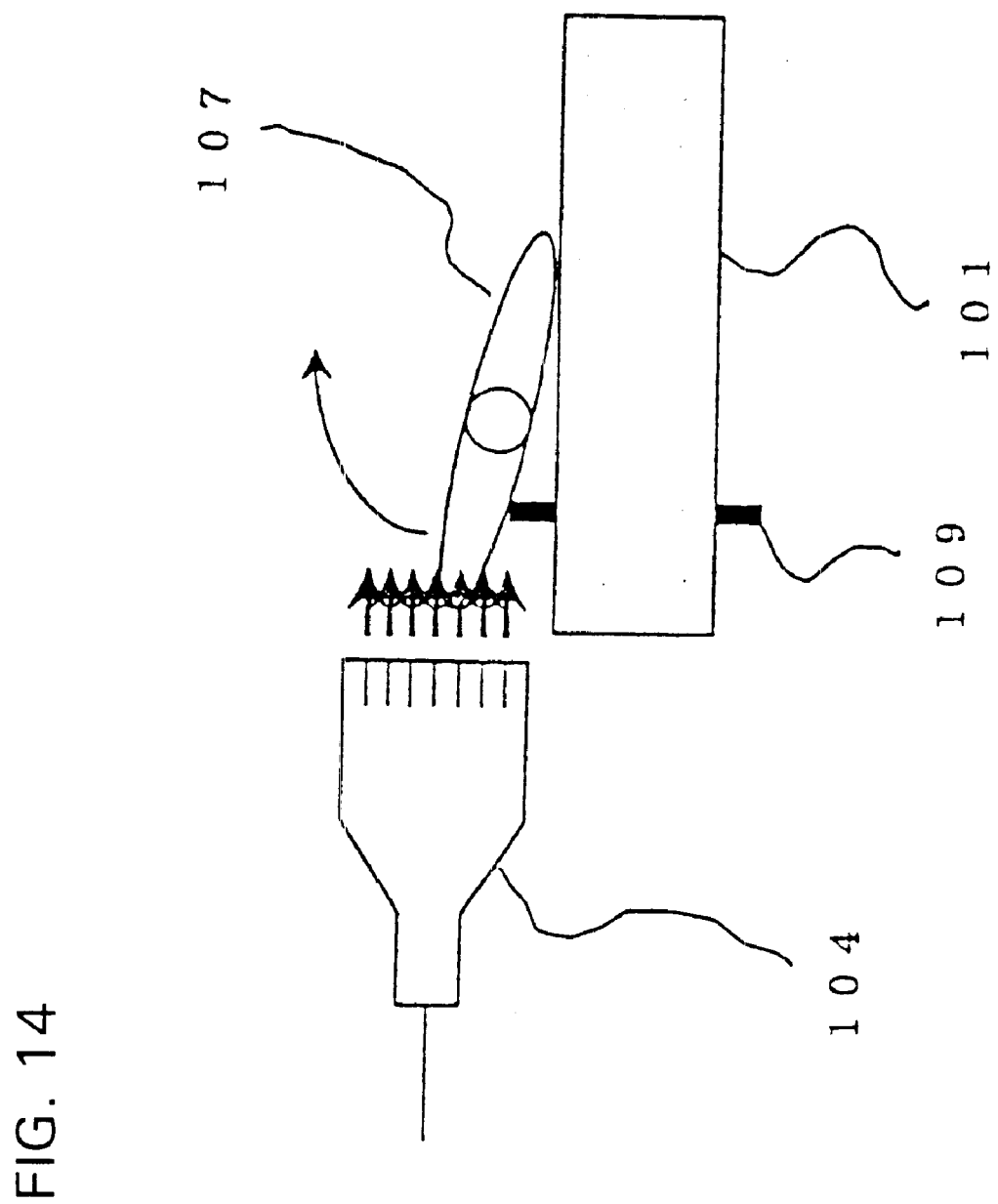
FIG. 14 is a view showing a state in which air is exhausted in preferred embodiment 2.

Also, FIG. 14 is a front view for illustrating a state of discharging the waste plastic by using the air nozzle 4 on the same sorting conveyor. Conventionally, for the waste plastics 107 deformed into a flat shape, in some cases, compressed air merely passes over the waste plastic 107 and thus the waste plastic 107 is not discharged by air. On the other hand, for the waste plastic 107 raised on the air nozzle side by the longitudinal ledge 109 as shown in FIG. 14, not only the area subjected to a discharge force from compressed air increases, but also the waste plastic 107 is raised by an upward flow of air that hits the longitudinal ledge 109 and changes its direction. By this effect, the waste plastic 107 can be subjected to a higher discharge force. Thereby, unfinished discharge operations are decreased remarkably.

Figure 15:
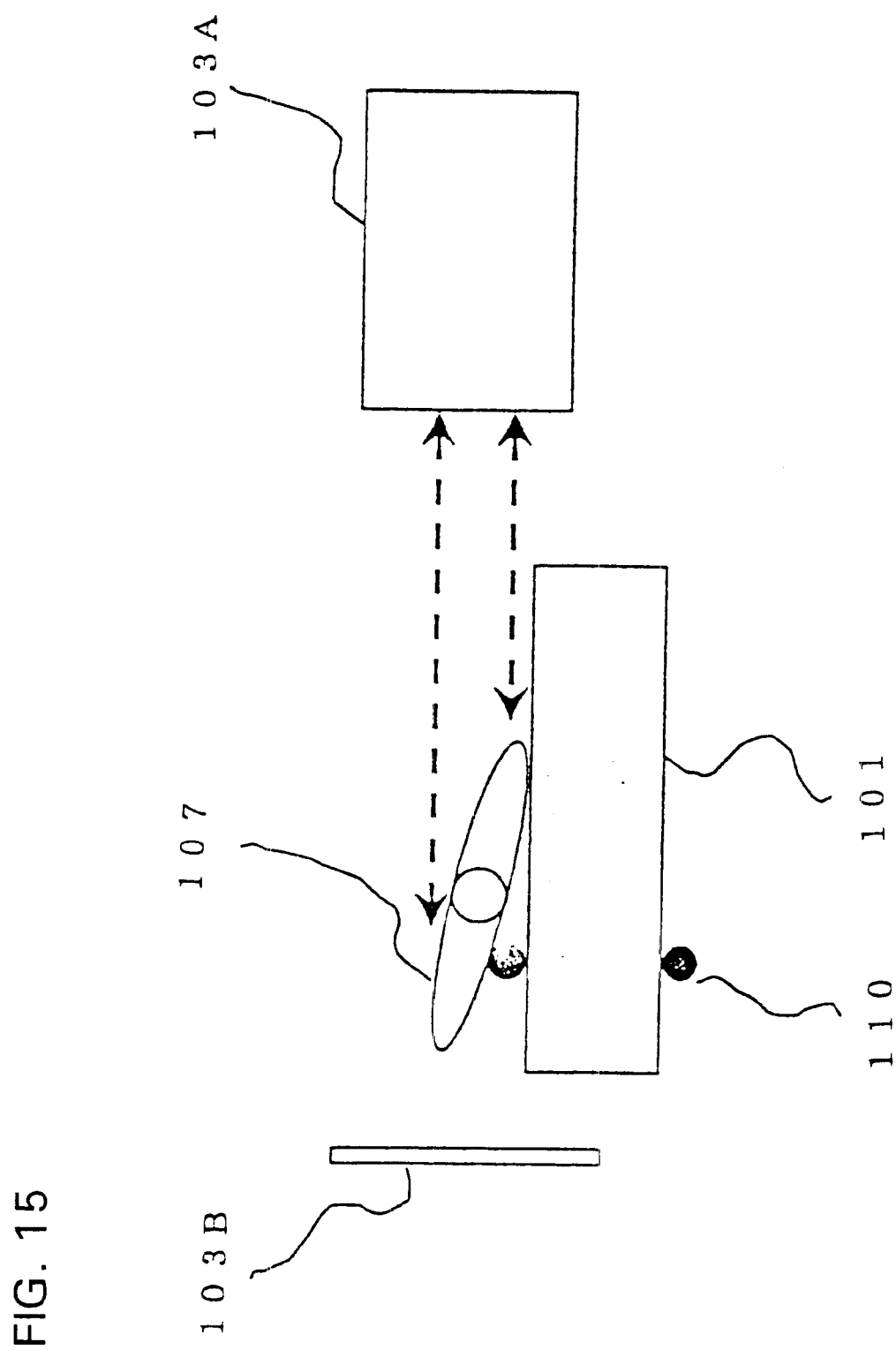
FIG. 15 is a view showing a material identification state in a case in which a wire belt is rotated contactingly in preferred embodiment 2.

FIG. 15 is a front view for illustrating a state of identifying the material of the waste plastics 107 by using a wire belt 110 provided so as to turn together with the sorting conveyor 101 while contacting with the sorting conveyor 101 over the whole periphery of the conveying surface thereof. This configuration can achieve the same effect (increase in identification accuracy, decrease in unfinished discharge operations) as in the case of the longitudinal ledge 109.

Figure 16:
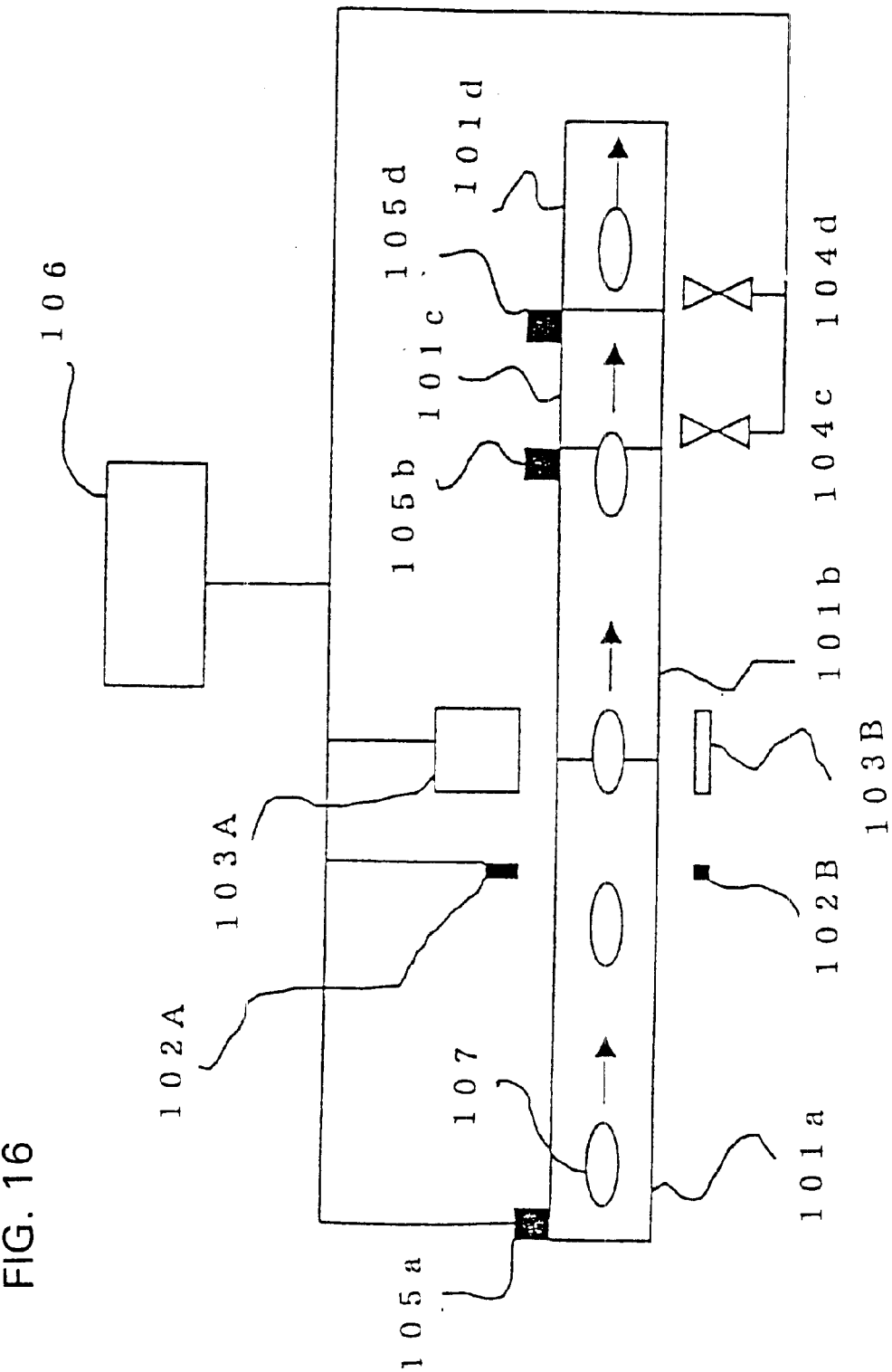
FIG. 16 is a planar configuration view for illustrating another waste plastics separator in accordance with preferred embodiment 2.
Figure 17:
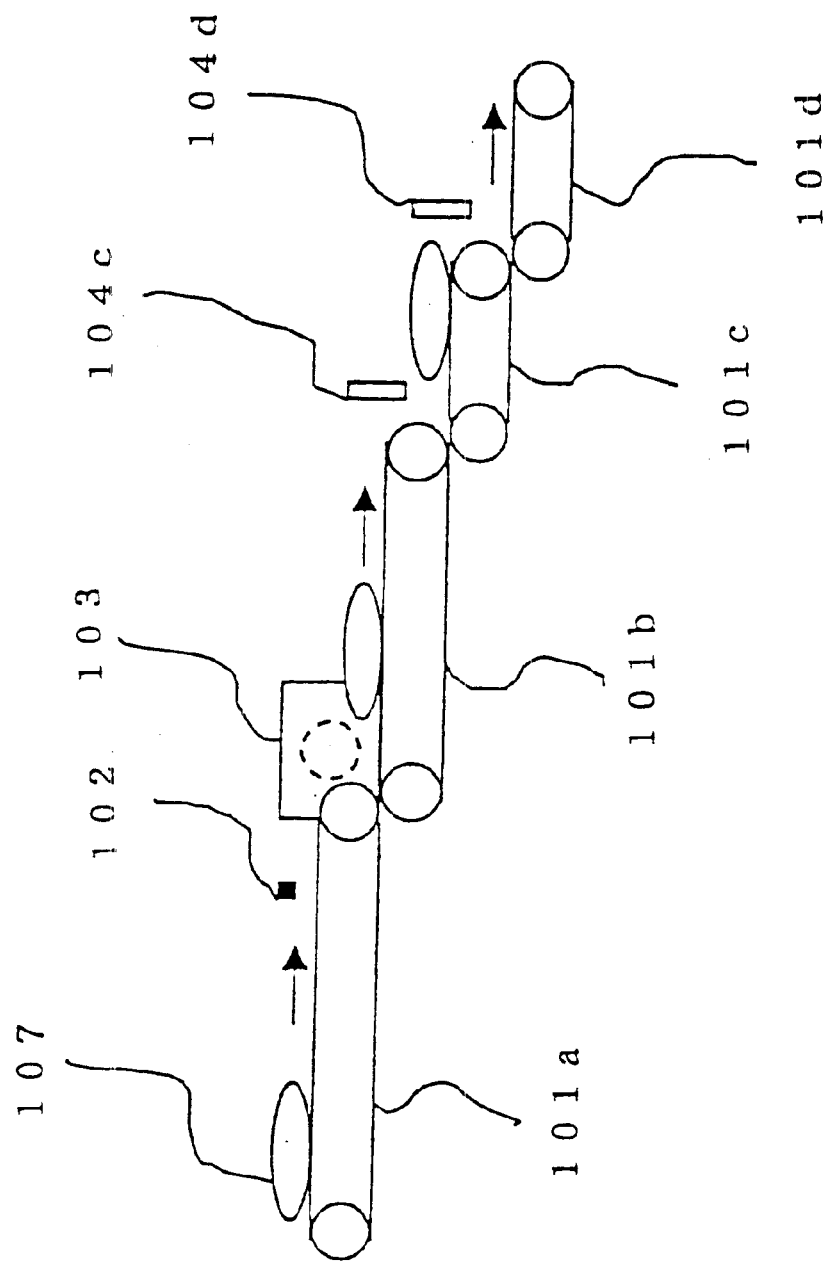
FIG. 17 is a side view of FIG. 16.

FIG. 16 is a planar configuration view for illustrating a second embodiment of the present invention. In FIG. 16, reference numerals 101a, 101b, 101c and 101d denote sorting conveyors (example of four-stage construction), 102 denotes a passage sensor (102A and 102B denote a sensor body and a reflecting plate, respectively), 103 denotes a material identifying device (103A and 103B denote a device body and a reflecting plate, respectively), 104 denotes an air nozzle, 105 denotes an encoder, 106 denotes a control unit, and 107 denotes a waste plastic. The suffixes a, b, c and d designate a device or a sensor provided at the respective conveyor position. FIG. 17 is a side view of FIG. 16. A difference in height is provided in each transfer portion of the sorting conveyors 101a and 101b, 101b and 101c, and 101c and 101d.

Figure 18:
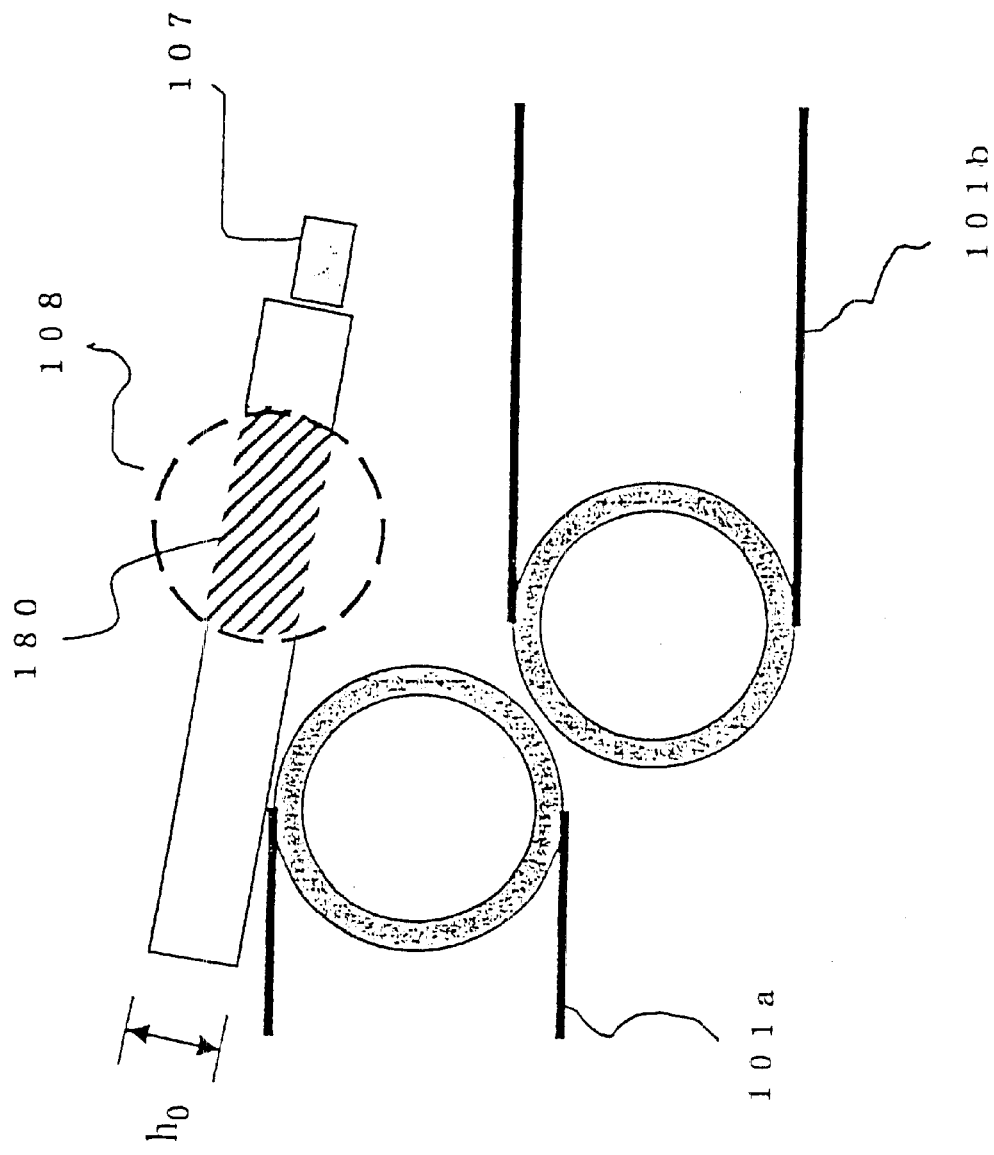
FIG. 18 is a view showing a material identification state in another waste plastics separator in accordance with preferred embodiment 2.

The waste plastics having been supplied from an arranging device not shown in FIG. 16 are first transferred to the sorting conveyor 101a. Subsequently, the fact that the waste plastic 107 has been conveyed on the conveyor 101a is detected by the passage sensor 102, and the control unit 106 is informed of that fact. The passage sensor 102 is a known sensor capable of detecting the presence of an object in front of the sensor, such as an optical sensor. The control unit 106 calculates the time at which the waste plastic 107 passes through the front of the material identifying device 103 from the signal output time of the passage sensor 102 and the data from the encoder 105a, and sends a trigger for executing material identification to the material identifying device 103 at that time. The material identifying device 103 is provided in the transfer portion of the conveyor 101a and the conveyor 101b. Since a difference in height is provided between the conveying surfaces of the conveyor 101a and the conveyor 101b and thus the conveying surfaces thereof are not at the same level as shown in FIG. 18, a material identification range 108 of the material identifying device can be set down to a portion below the conveying surface of the conveyor 101a. Therefore, even the waste plastic deformed into a flat shape, which has conventionally caused to pass through only the peripheral portion of the material identification range 108 of the material identifying device, can be caused to pass through the central portion of the measurement region, so that a projected area 180 (hatched portion in FIG. 18) increases, which increases the accuracy of material identification.

Also, in the air discharge portion as well, a difference in height is provided between the sorting conveyors 101b and 101c as in the case shown in FIG. 18. Therefore, by providing the air nozzle in this portion, compressed air can be blown surely to the waste plastic deformed into a flat shape. Thereby, unfinished discharge operations are decreased remarkably.

Figure 19:
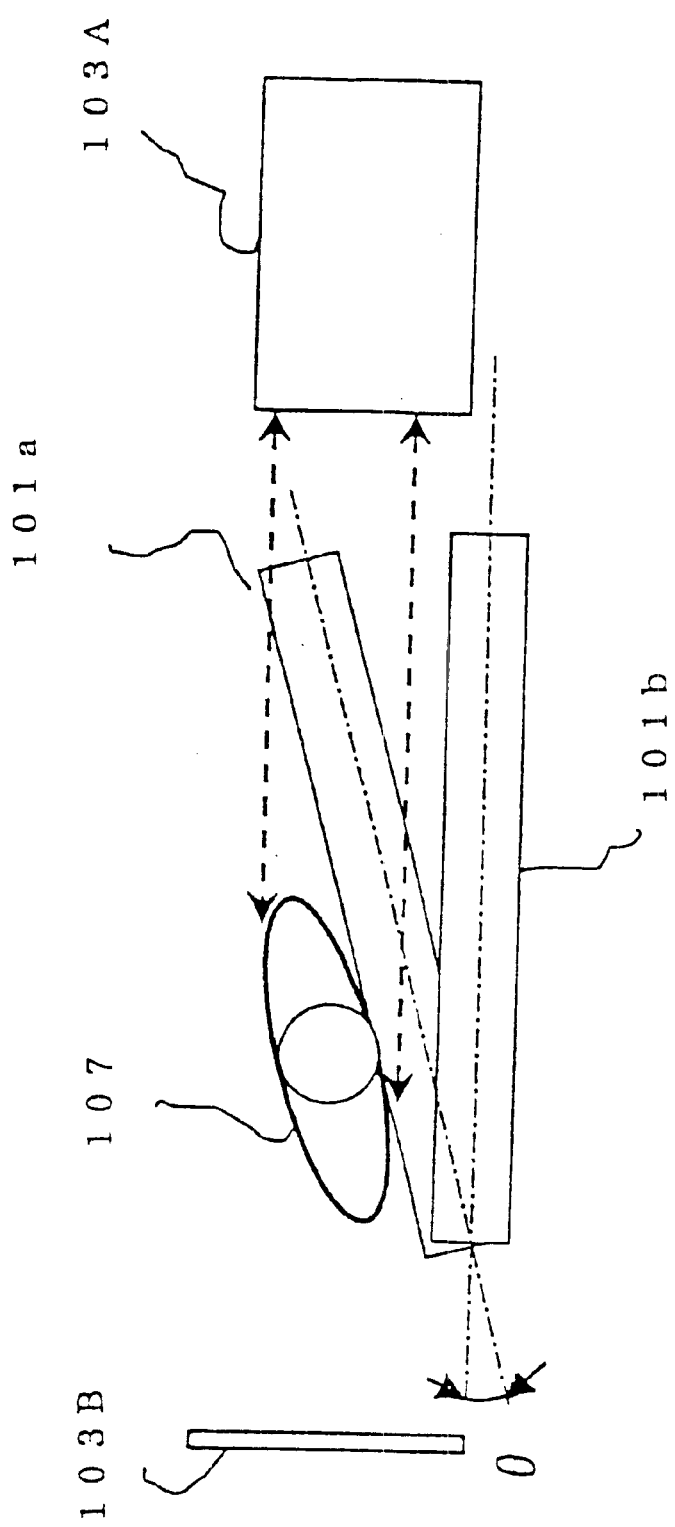
FIG. 19 is a view showing a material identification state in a case where a conveying surface is provided so as to be tilted in preferred embodiment 2.

If the conveyor 101a is tilted at an angle θ with respect to the conveyor 101b as shown in FIG. 19, even for the waste plastic heavily deformed into a extremely flat shape, the projected area can be increased because the measurement axis of the material identifying device is set in parallel with the conveying surface of the conveyor 101b and the conveying surface of the conveyor 101a is tilted with respect to the measurement axis of the material identifying device. Therefore, as in the case where a difference in height is provided as described above, the material of waste plastic 107 can be identified with high accuracy, and unfinished discharge operations are decreased.

Preferred Embodiment 3

Preferred embodiment 3 is characterized in that in the plastics sorting method in which the material of plastics is identified by comparing the actually measured value with plastic with the reference value without plastic by using an inspection device provided in a halfway position of the conveying device for plastics, any plastic being conveyed is discharged by plastics eliminating means on the upstream side of the inspection device, by which a space in which no plastic exists is formed on the conveying device, and the reference value is obtained by the inspection device.

Figure 26:
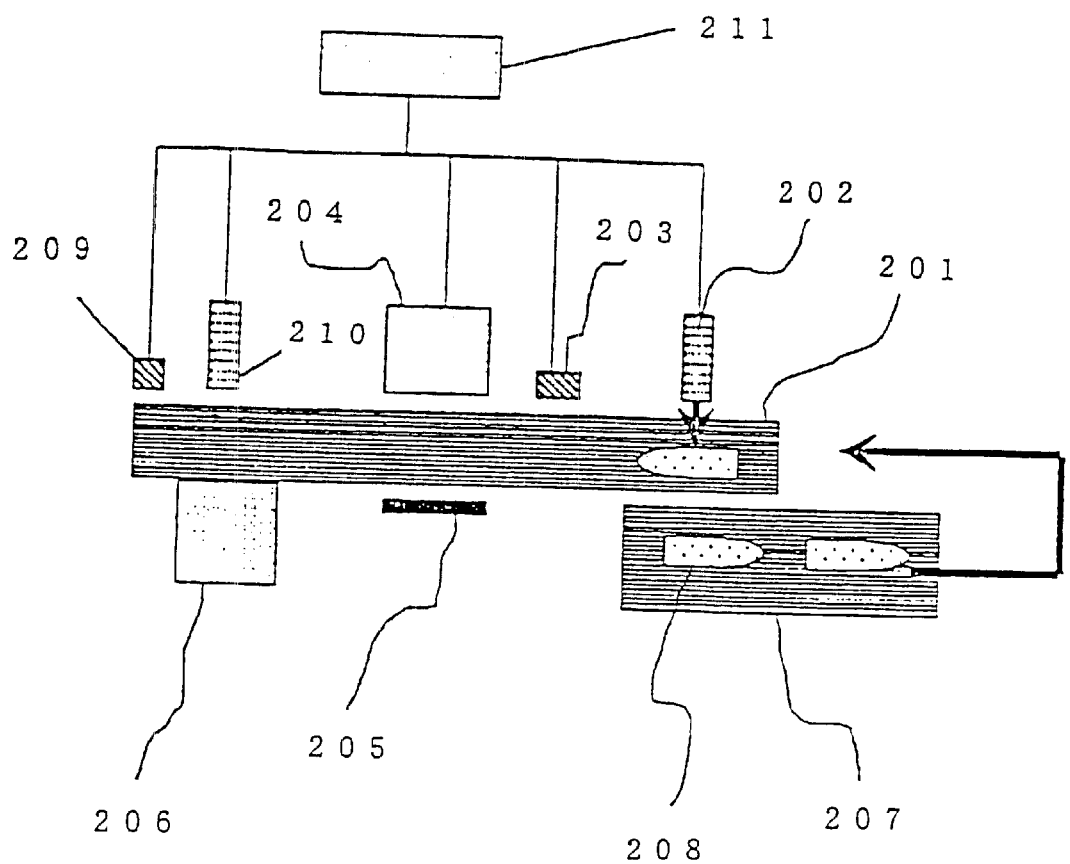
FIG. 26 is a view showing an arrangement of a plastics separator in preferred embodiment 3.

FIG. 26 shows one embodiment of plastics sorting method and system. First, the ordinary plastics sorting treatment will be explained.

In order to sort plastics 208 one after another by the material, the plastics 208 must be conveyed in a state of being separated from one another. For this purpose, an arranging device (not shown) is provided in the upstream process of the plastics separator.

The plastic to be sorted transfers from the arranging device to a conveying device 201, and after crossing the front of an air nozzle 202, passes through a sensor 203 for detecting the passage of the plastic, and the material thereof is identified by a near infrared reflecting plate 205 and an inspection device 204. According to this identification result, the plastic 208 is sorted and recovered by an air nozzle 210 at a predetermined position of a sorting chute 206. An encoder 209 measures the conveying speed of the conveying device 201, and a control unit 211, which is connected with the air nozzle 202, the sensor 203, the inspection device 204, the encoder 209, and the air nozzle 210, performs data collection and calculation, or gives a command to each pieces of equipment.

FIGS. 20 to 25 are graphs schematically showing a change in waveform of reflected near infrared rays on the inspection device 204.

Figure 20:
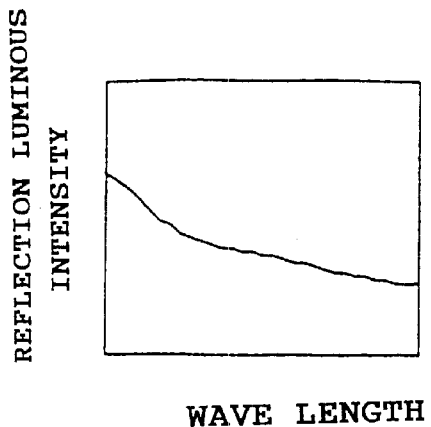
FIG. 20 is a graph showing a waveform of reflected near infrared rays in a state in which there is no plastic measured by an inspection device in preferred embodiment 3.
Figure 21:
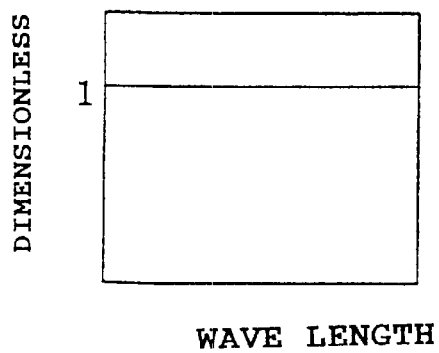
FIG. 21 is a graph in which the waveform shown in FIG. 20 is normalized by itself.
Figure 22:
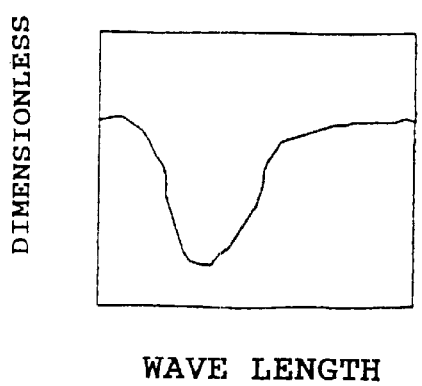
FIG. 22 is a graph in which a waveform of reflected near infrared rays from a plastic having a sort of material is normalized by the waveform shown in FIG. 20.
Figure 23:
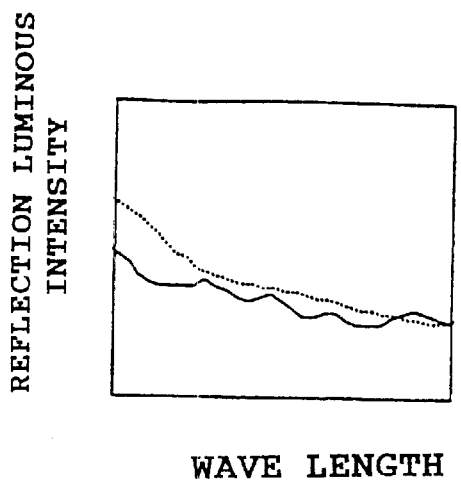
FIG. 23 is a graph showing a waveform of reflected near infrared rays in a state in which there is no plastic measured under a condition that sorting treatment is rendered and stain adheres to a reflecting plate in preferred embodiment 3.
Figure 24:
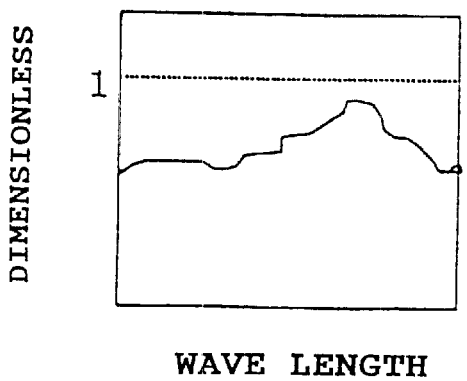
FIG. 24 is a graph in which the waveform shown in FIG. 23 is normalized by the waveform shown in FIG. 20.
Figure 25:
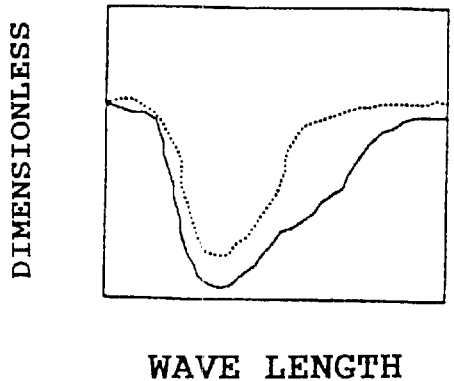
FIG. 25 is a graph in which a waveform of reflected near infrared rays from the same plastic as that shown in FIG. 22 is normalized by the waveform shown in FIG. 20.

FIG. 20 shows a waveform of reflected near infrared rays in the state in which no plastic exists before the plastics sorting treatment is started (initial reference waveform). The abscissas and the ordinates represent wavelength and reflection luminous intensity, respectively. The waveform obtained by normalizing the waveform shown in FIG. 20 by itself (initial reference normalized waveform) is 1 over the whole wavelength as shown in FIG. 21. The waveform obtained by normalizing a reflected near infrared ray waveform obtained by measuring some plastic by the waveform shown in FIG. 20 (initial reference normalized measured waveform) is shown in FIG. 22. Even if the plastics sorting treatment is started from this initial state, the contamination of reflecting plate surface proceeds due to the contact with the plastic, and further a wide range is sometimes contaminated by content residues. In such a case, the waveform in the state in which no plastic exists (elapsed time reference waveform) changes from the broken line (initial reference waveform) to the solid line (elapsed time reference waveform) as shown in FIG. 23. Therefore, if the waveform is normalized by the waveform shown in FIG. 20, which is recorded at the start time of treatment, the normalization cannot be effected satisfactorily as shown by the broken line (initial reference normalized waveform) and the solid line (initial reference elapsed time normalized waveform) in FIG. 24. Even if the reflected near infrared rays for the same plastic for which the result in FIG. 22 is obtained are measured and the waveform is normalized by the waveform shown in FIG. 20, only the waveform of solid line in FIG. 25 is obtained. This means that although the waveform indicated by the broken line (initial reference normalized measured waveform in FIG. 22) should be obtained, the waveform indicated by the solid line is obtained due to the contamination of reflecting plate surface. Comparing these two waveforms with each other, they can be regarded as the same waveforms broadly, but regarding the details, they cannot be regarded as the same waveforms, so that the accuracy of identification result decreases.

Thereupon, the treatment for again obtaining the waveform of reflected near infrared rays in the case where no plastic exists must be executed with predetermined timing based on the material identification accuracy.

Generally, it can be presumed that the degree of decrease in reflectance of reflecting plate due to the contact with a plastic depends on the treatment time. Therefore, after the treatment is executed for a fixed period of time, the treatment for again obtaining the waveform of reflected near infrared rays in the case where no plastic exists is executed.

A general explanation of the present invention will be given with reference to FIG. 26.

The elapsed time from the start of treatment is monitored by using the control unit 211. However, the time may be monitored by using the inspection device 204. When the condition that a fixed period of time has elapsed is fulfilled, the control unit 211 first injects compressed air continuously from the air nozzle 202. Therefore, the plastics having been conveyed by the conveying device 1 are discharged completely from the conveying device 201, so that no plastic is conveyed to the downstream side of the air nozzle 202. Although the air nozzle is shown as the plastics eliminating means in FIG. 26, general mechanical means such as a lever and a hammer may be used. The time from when air injection is started to when plastics are eliminated completely from the region between the air nozzle 202 and the inspection device 4 can be calculated from the conveying speed (measured by the encoder 209) of the conveying device 201 and the interval between the air nozzle 202 and the inspection device 204, so that the work for again obtaining the waveform of reflected near infrared rays in the state in which no plastic exists is performed after waiting for this period of time. After this period of time has elapsed, the fact that no plastic is conveyed is confirmed again by the output of the sensor 203, and the control unit 211 gives the inspection device 204 a command to again obtain the waveform of reflected near infrared rays in the state in which no plastic exists. Since no plastic exists between the inspection device 204 and the near infrared rays reflecting plate 205 due to air injection, the waveform of reflected near infrared rays in the state in which no plastic exists can be obtained again. As soon as this work is finished, the control unit 211 is informed of the finish of work by the inspection device 204. After receiving a command for finishing work from the inspection device 204, the control unit 211 stops the continuous injection of air, by which the ordinary sorting treatment is restarted.

The plastics discharged from the conveying device 201 by the continuous injection of air are recirculated to the upstream portion of the conveying device 201 by a recirculating conveying device 207 using the ordinary conveying method etc. Thus, the waveform of reflected near infrared rays in the state in which no plastic exists can be obtained again without decreasing the recovery percentage.

Preferred Embodiment 4

Preferred embodiment 4 provides a waste plastics material identifying device comprising a light source for radiating light including near infrared rays; a reflecting plate disposed substantially at right angles to the light axis of light source so as to hold a waste plastic whose material is to be identified between the reflecting plate and the light source; a spectroscope for the spectrometry of near infrared rays which are radiated from the light source and are reflected by the waste plastic or the reflecting plate; and an arithmetic unit for determining the material of waste plastic based on the spectrometry result of spectroscope, wherein irregularities are provided on the reflecting surface of reflecting plate.

Also, in the above-described waste plastics material identifying device, when the reflecting surface is a diffuse reflector, the cross-sectional shape of irregularities of reflecting surface is formed into a triangular wave shape.

Also, in the above-described waste plastics material identifying device, when the reflecting surface is a diffuse reflector, the cross-sectional shape of irregularities of reflecting surface is formed into a concave arcuate wave shape.

Also, in the above-described waste plastics material identifying device, when the reflecting surface is a mirror reflector, the cross-sectional shape of irregularities of reflecting surface is formed into a rectangular wave shape.

Further, in the above-described waste plastics material identifying device, the area of convex portions of reflecting surface is set at 50% or less of the total surface area.

First Embodiment

Figure 27:
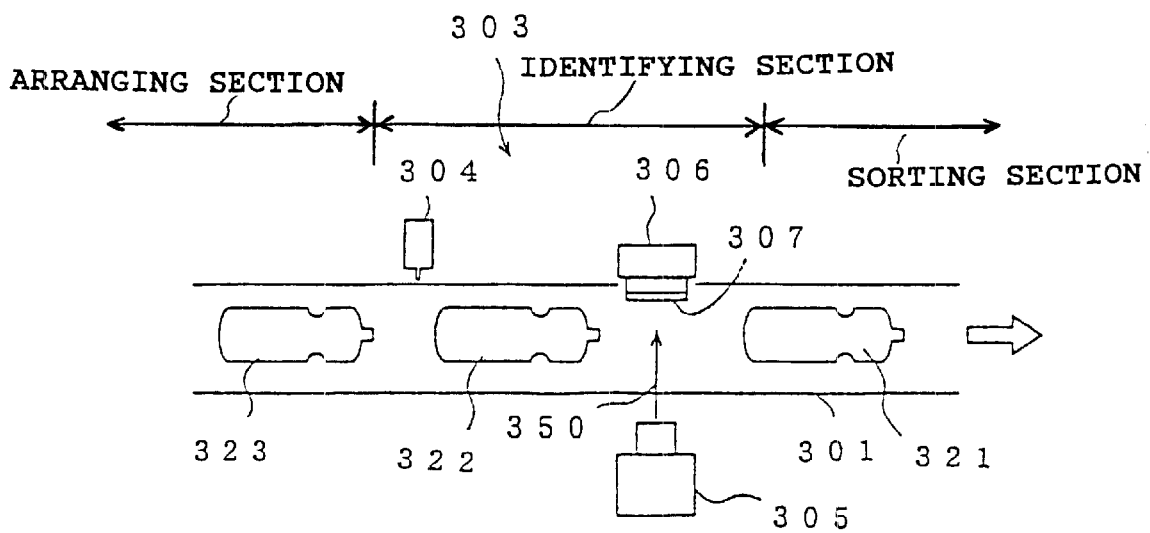
FIG. 27 is a plan view showing a configuration of waste plastics material identifying device in preferred embodiment 4.
Figure 28:
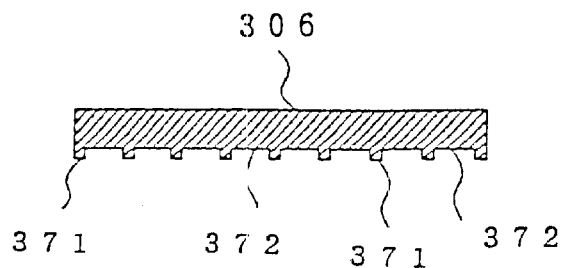
FIG. 28 is a sectional view of a reflecting plate shown in FIG. 27.
Figure 29:
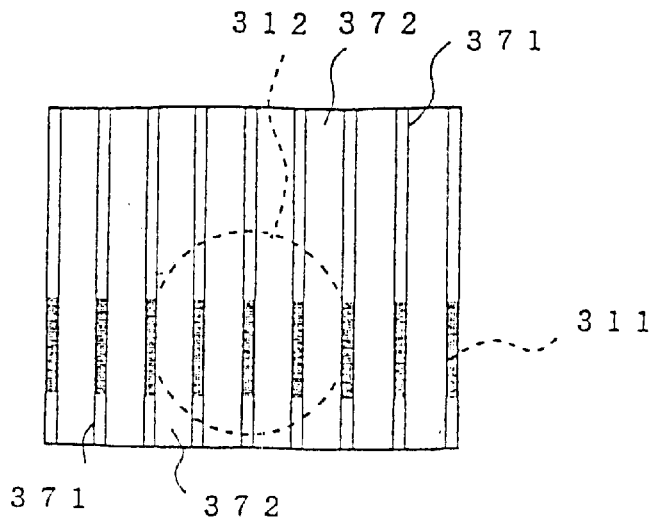
FIG. 29 is a front view showing a contaminated condition of a reflecting plate in preferred embodiment 4.

FIG. 27 is a plan view showing a configuration of a first embodiment of the present invention, FIG. 28 is a sectional view of a reflecting plate shown in FIG. 27, and is a front view showing a contaminated condition of the reflecting plate of the first embodiment. In these figures, a case where the first embodiment of the present invention is applied to a device for continuously identifying the material of a plastic bottle selected from wastes is shown. In FIGS. 27 to 29, reference numeral 301 denotes a belt conveyor, and 321, 322, . . . denote many plastic bottles. Reference numeral 303 denotes an identifying device which is provided in an identifying section of a conveyor line to identify the material of waste plastic. The plastic bottles 321, 322, . . . are conveyed in sequence in the direction of the outline type arrow by the conveyor 301.

Reference numeral 304 denotes a bottle sensor which is provided near the inlet of the identifying device 303 to detect the presence of the plastic bottles 321, 322, . . . , 305 denotes a reflection type near infrared rays spectroscope, and 306 denotes a reflecting plate disposed so as to be opposed to the reflection type spectroscope with the belt conveyor 301 being held therebetween. Also, reference numeral 307 denotes irregularities formed in a vertical striped pattern on the reflecting surface of the reflecting plate 306, and 371 and 372 denote a convex portion and a concave portion of the irregularities 307 (general term), respectively. The reflection type spectroscope 305 incorporates a light source including near infrared rays 350, and the projected light is projected on the reflecting plate 306 through the light axis in the direction crossing the conveying path of the plastic bottles 321, 322, . . . on the top surface of the belt conveyor 301. Also, the reflecting surface of the reflecting plate 306 is a mirror reflector of perfect reflection, and the cross section thereof is shown in FIG. 28.

As shown in FIG. 28, in order for the irregularities 307 formed on the reflecting plate 306 to perfectly reflect the incident light in the right-angled direction, the cross-sectional shape of the reflecting surface is formed into a square or rectangular shape without an inclined face so that the reflecting surfaces face each other in the direction at right angles to the light axis. In particular, in the present invention, the convex portions 371 having a narrow width and the concave portions 372 having a wide width are formed into a continuous rectangular wave shape so that the area ratio of the convex portions 371 with respect to the total reflecting surface is remarkably low. The near infrared rays 350 projected from the reflection type spectroscope 305 are reflected by the reflecting plate 306, and the reflected light strikes the spectroscope 305 after passing through an inverse light path along the injected light axis.

On the upstream side of the identifying section in which the identifying device 303 is provided along the line of the belt conveyor 301, an arranging section is provided to arrange the plastic bottles 321, 322, . . . selected from wastes on the belt conveyor 301. Also, on the downstream side of the identifying section, a sorting section is provided to sort the identified plastic bottles 321, 322, . . . by material. In addition, although not shown in the figure, a driving mechanism for the belt conveyor 301 is provided with an encoder for detecting the travel speed, and also there are provided a control unit etc. having an arithmetic function of calculating the material from the spectrometry result of the reflection type spectroscope 305 or controlling the measuring operation etc.

The following is a description of the operation of the first embodiment configured as described above.

Many plastic bottles 321, 322, . . . having been selected from wastes are arranged in the arranging section preceding on the line, and are conveyed into the identifying section in sequence by the belt conveyor 301. For the plastic bottles 321, 322, . . . having been conveyed into the identifying section, the presence thereof is first detected by the bottle sensor 304 provided at the inlet. If the bottle sensor 304 detects each of the plastic bottles 321, 322, . . . , the counting operation of the aforementioned encoder is started based on the detection signal. An operation signal is generated from the control unit according to the output signal of encoder, and thus the measuring operation of the reflection type spectroscope 305 is performed each time each of the plastic bottles 321, 322, . . . being conveyed arrives.

At the arrival time of, for example, the plastic bottle 321, which is calculated by the control unit, the identifying operation of the material of the plastic bottle 321 is started by the reflection type spectroscope 305. By the start of identifying operation, the near infrared rays 350 are projected from the reflection type spectroscope 305 onto the reflecting plate 306, and the reflected light strikes the reflection type spectroscope 305. At this time, as in the case of the conventional system, the projected light and reflected light of the near infrared rays 350 transmit the plastic bottle 321 conveyed while contacting with the reflecting plate 306 on the belt conveyor 301. The spectrometry output of the reflection type spectroscope 305 is compared with a background waveform registered in advance in the measuring process, by which the material of the plastic bottle 321 is identified.

In the first embodiment of the present invention, however, the rectangular wave shaped irregularities 7 provided with the convex portions 371 having a narrow width are formed on the reflecting surface of the reflecting plate 6 as described above. Therefore, the portion of the reflecting surface of the reflecting plate 306, which is contaminated by the contact with the plastic bottles 321, 322, . . . conveyed in sequence, is limited to the convex portions 371 having a small area of the rectangular wave shaped irregularities 307. That is to say, most of the near infrared rays 350 projected from the reflection type spectroscope 305 are reflected by the concave portions 372 of the irregularities 307, which occupy a wide area with respect to the total reflecting surface and are not contaminated. Therefore, in comparison with the conventional system using a reflecting plate having a flat reflecting surface, the contaminated portions are discontinuous. A contaminated condition of the reflecting surface of the reflecting plate 306 at this time is shown in FIG. 29.

In FIG. 29, reference numerals 311 and 312 denote a contaminated portion and an identification region, respectively. As is apparent from FIG. 29, the area of the contaminated portion 311 occupying in the identification region 312 is very small, so that the reflectance is not decreased, and thus the identification of material is scarcely affected. Therefore, for example, when the area ratio of the convex portions 371 to the concave portions 372 is 1:9, even if the reflectance of the convex portions 371 is made 0% by contamination with the initial reflectance being the reference, as the whole of the reflecting plate 306, the decrease in reflectance can be kept at 90%. By utilizing the spectrometry result of the reflection type spectroscope 305 for the identification region 312, the material of the plastic bottles 321, 322, . . . is identified by an arithmetic unit, not shown. The identified plastic bottles 321, 322, . . . are sent into the sorting section on the downstream side in sequence and are sorted by material according to the identification result.

Second Embodiment

Figure 30:
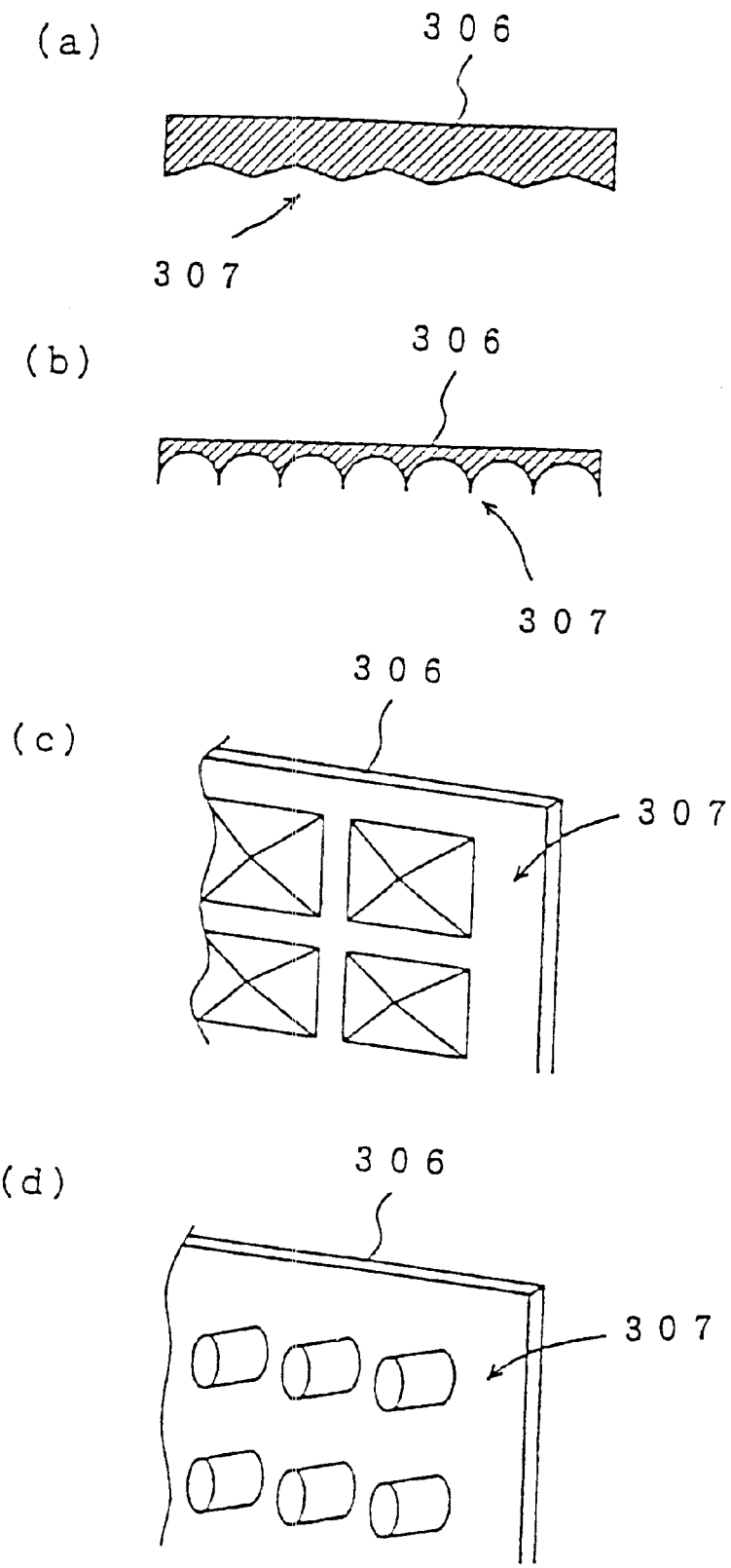
FIG. 30 is an explanatory view showing another construction of a waste plastics material identifying device in preferred embodiment 4.

FIG. 30 is an explanatory view showing a construction of an essential portion of a second embodiment of the present invention. As the reflecting plate 306 of the second embodiment, a diffuse reflector on which the reflected light is reflected in various directions and is scattered is used. In FIG. 30(a), the cross-sectional shape of the irregularities 307 on the reflecting surface is formed into a triangular wave shape. In FIG. 30(b), the irregularities 307 having a concave semicircular or arcuate shape are formed on the reflecting surface of the reflecting plate 306. Also, in FIGS. 30(c) and 30(d), quadrangular pyramidal and columnar irregularities 7 are provided, respectively. In the case of diffuse reflection, the angular relationship between the light source side and the reflecting plate 306 is not so strict unlike the mirror reflector, so that the irregularities 307 can be set freely. In either case of mirror reflector and diffuse reflector, the contaminated portion 311 of reflecting surface is limited to the convex portions 371 only as described above, so that the decrease in reflectance of the reflecting plate can be kept to the minimum.

In the above-described embodiments, there has been explained as an example the case where vertically striped irregularities having a rectangular wave shaped cross section when a mirror reflector is used as the reflecting plate are formed. However, obliquely striped or transversely striped irregularities may be formed. Also, although triangular wave shaped and semicircular wave shaped irregularities are shown in the figures when a diffuse reflector is used as the reflecting plate, in addition to these shapes, a conical shape, a pyramidal shape having a trapezoidal cross section, or a combination of these shapes can be formed. Also, although the case where waste plastics are continuously measured and identified in a waste disposal facility has been explained in the above-described embodiments, the present invention is not necessarily limited to the above-described embodiment; for example, the waste plastics may be measured in a batch mode, or the bottle sensor may be provided on the reflecting plate etc. to omit the encoder.

The present invention provides a waste plastics material identifying device comprising a light source for radiating light including near infrared rays; a reflecting plate disposed substantially at right angles to the light axis of light source so as to hold a waste plastic whose material is to be identified between the reflecting plate and the light source; a spectroscope for the spectrometry of near infrared rays which are radiated from the light source and are reflected by the waste plastic or the reflecting plate; and an arithmetic unit for determining the material of waste plastic based on the spectrometry result of spectroscope, wherein irregularities are provided on the reflecting surface of reflecting plate.

Also, in the above-described waste plastics identifying device, when the reflecting surface is a diffuse reflector, the cross-sectional shape of irregularities of reflecting surface is formed into a triangular wave shape.

Also, in the above-described waste plastics identifying device, when the reflecting surface is a diffuse reflector, the cross-sectional shape of irregularities of reflecting surface is formed into a concave arcuate wave shape.

Also, in the above-described waste plastics identifying device, when the reflecting surface is a mirror reflector, the cross-sectional shape of irregularities of reflecting surface is formed into a rectangular wave shape.

Further, in the above-described waste plastics identifying device, the area of convex portion of reflecting surface is set at 50% or less of the total surface area.

According to the present invention, in the device for identifying the material of waste plastic as described above, the reflecting plate is contaminated by stain adhering to the waste plastic, and the irregularities are formed on the surface to limit the contaminated portion.

As a result, the decrease in reflectance of the reflection type near infrared rays spectroscope can be kept to the minimum, and thus the accuracy of material identification can be kept high.

Preferred Embodiment 5

Preferred embodiment 5-1 provides a sorting device comprising a conveying device for conveying articles by a conveyor; and a compressed air injection nozzle disposed at the side of the conveying device over the length in the conveying direction of the conveying device to inject compressed air onto an article on the conveyor conveying surface of the conveying device from the side of the conveying device to send the article into recovery means, wherein
a compressed air layer is formed on the conveyor conveying surface by the injection of compressed air from the compressed air injection nozzle, and compressed air with a lower pressure is injected into a lower layer close to the conveyor conveying surface of the compressed air layer than into an upper layer.

Preferred embodiment 5-2 provides a sorting device comprising a conveying device for conveying articles by a conveyor; and a compressed air injection nozzle disposed at the side of the conveying device over the length in the conveying direction of the conveying device to inject compressed air onto an article on the conveyor conveying surface of the conveying device from the side of the conveying device to send the article into recovery means, wherein the compressed air injection nozzle has a plurality of injection ports; and relatively weak compressed air is injected from an injection port disposed at a low position close to the conveyor conveying surface of the conveying device, and relatively strong compressed air is injected from an injection port disposed at a high position higher than the low-positioned injection port.

Preferred embodiment 5-3 provides a sorting device comprising a conveying device for conveying articles by a conveyor; and a compressed air injection nozzle disposed at the side of the conveying device over the length in the conveying direction of the conveying device to inject compressed air onto an article on the conveyor conveying surface of the conveying device from the side of the conveying device to send the article into recovery means, wherein the compressed air injection nozzle has a plurality of injection ports; compressed air with approximately equal intensity is injected from an injection port disposed at a low position close to the conveyor conveying surface of the conveying device and an injection port disposed at a high position higher than the low-positioned injection port; and the low-positioned injection port is provided at a position relatively far from the conveying device, and the high-positioned injection port is provided at a position relatively close to the conveying device.

Preferred embodiment 5-4 is characterized in that the compressed air injection time of the compressed air injection nozzle is set so as to increase toward the downstream side in the article conveying direction.

Preferred embodiment 5-4 provides a sorting device comprising a conveying device for conveying articles by a conveyor; a compressed air injection nozzle disposed at the side of the conveying device over the length in the conveying direction of the conveying device to inject compressed air onto an article on the conveyor conveying surface of the conveying device from the side of the conveying device to send the article into recovery means; an article detecting sensor for detecting the fact that an article has been charged onto the conveying device; a position sensor for continuously identifying the position of article on the conveying device; an article property inspection sensor for inspecting any one property or a plurality of properties of color, material, and shape of article; and a control unit which determines the operation timing of the article property inspection sensor from the output of the article detecting sensor and the output of the position sensor and sends the article into recovery means by determining the injection timing of the compressed air injection nozzle.

Next, an embodiment of the present invention will be described with reference to the accompanying drawings.

Figure 31:
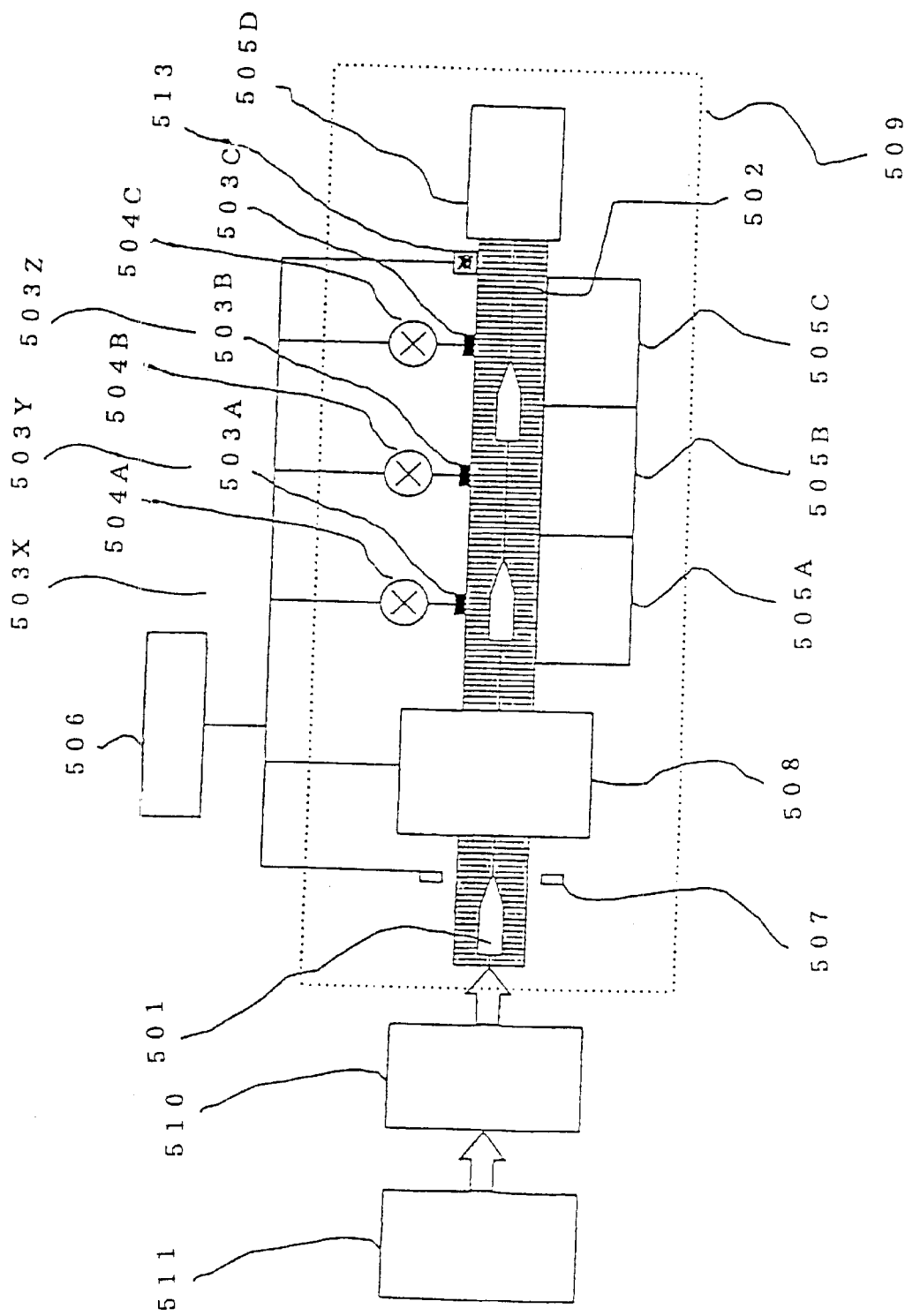
FIG. 31 is a plan view showing an example in which a high-speed sorting device in accordance with preferred embodiment 5 is applied to waste plastics sorting.
Figure 32:
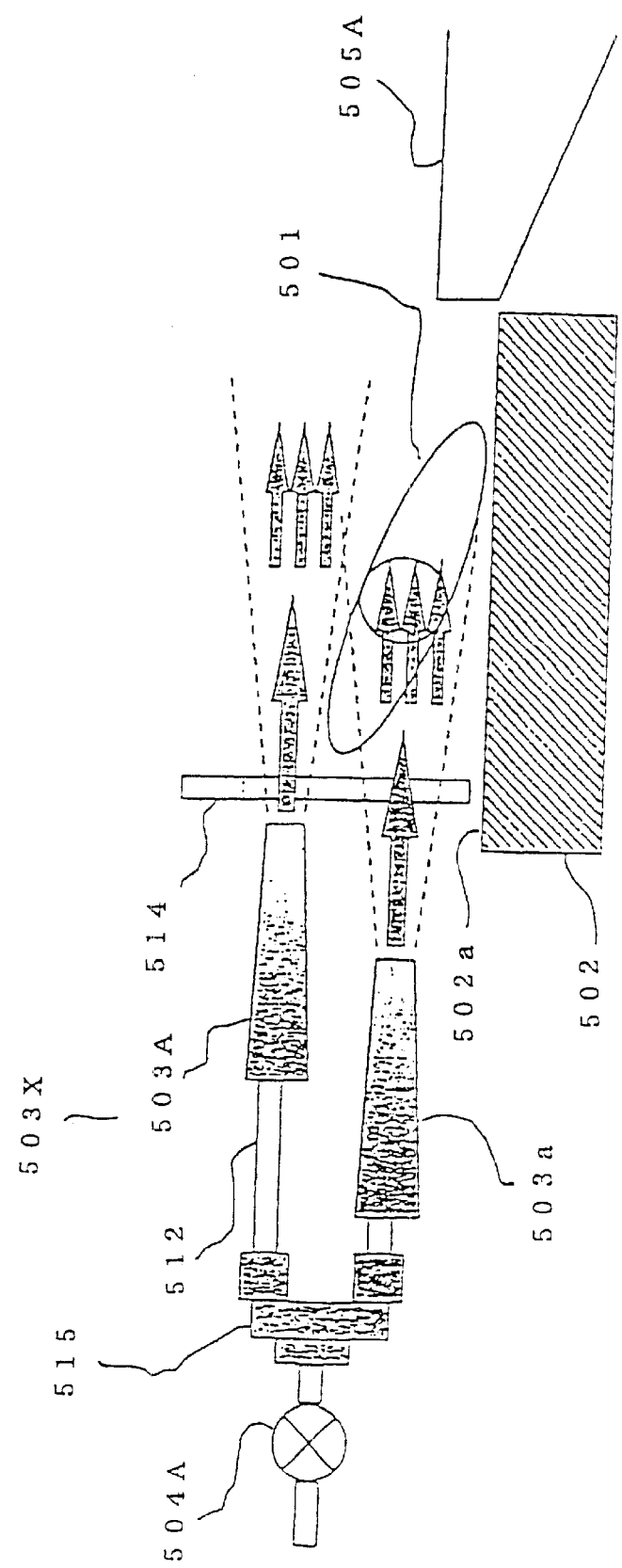
FIG. 32 is a sectional view showing a state in which a compressed air injection nozzle is installed and a state in which waste plastics are discharged in a high-speed sorting device in accordance with preferred embodiment 5.

FIGS. 31 and 32 are views relating to an embodiment of a high-speed sorting device in accordance with the present invention. FIG. 31 is a plan view showing an example in which the sorting device is applied to a system in which waste plastics including many lightweight and flat-shaped plastics are classified into four types by property and are sorted into recovery chutes 505A to 505D. FIG. 32 is a sectional view showing a state in which a flat-shaped waste plastic is discharged by a difference in injection flow from each injection port of the compressed air injection nozzle.

On one side of a sorting belt conveyor 502, a plurality of recovery chutes 505A to 505C are provided. On the other side thereof, compressed air nozzles 503X, 503Y, and 503Z are provided so as to correspond to the positions of the recovery chutes 505A to 505C. The compressed air injection nozzle 503X has an upper nozzle 503A forming an upper injection port and a lower nozzle 503a forming a lower injection port so that compressed air is injected in the substantially horizontal direction from the direction substantially perpendicular to the conveying direction of the conveyor 502 onto a waste plastic 501 on the conveyor conveying surface 502 to send the waste plastic 501 into the recovery chute 505A. The compressed air injection nozzles 503Y and 503Z also have an upper nozzle 503B, an upper nozzle 503C and a lower nozzle 503b, a lower nozzle 503c (not shown), respectively, and have the same construction as that of the compressed air injection nozzle 503X. Also, on the downstream side at the downstream end of the conveyor 502, a recovery chute 505D is provided.

The waste plastics 501 fed from a waste plastics supply device 511 are arranged by a waste plastics arranging device 510. By these pretreatment processes, the waste plastics 501 are supplied to a high-speed sorting device 509 one after another at proper intervals without being lapped on each other. The waste plastics 501 supplied from the pretreatment process is transferred to the sorting conveyor 502, and then a passage sensor 507 detects the fact that the waste plastic has passed through a predetermined position on the conveyor 502. This detection timing is sent to a control unit 506. Since the operating speed of the conveyor 502 is monitored by using an encoder 513, the control unit calculates the time when the waste plastic 501 arrives at a waste plastics property inspection sensor 508, and with the resultant timing, any one property or a plurality of properties of color, material, and shape of waste plastic are measured. The measurement result is again sent to the control unit 506, by which the number of the recovery chute into which the waste plastic is to be sorted is determined. The distance from the waste plastics property inspection sensor 508 to each of the recovery chutes 505A to 505C is known, so that the time when the waste plastic 501 arrives can become known in advance. For example, if the control unit 506 determines that "the waste plastic 501 is discharged into the recovery chute 505A", the control unit 506 monitors the output of the encoder 513, and issues a command for releasing an electromagnetic valve 504A at the time when the waste plastic 501 arrives at the front of the recovery chute 505A. Thereby, compressed air is injected from the upper nozzle 503A and the lower nozzle 503a of the compressed air injection nozzle 503X. The waste plastic 501 is subjected to the injection of compressed air from the other side of the belt conveyor 502, and thereby is blown and discharged into the recovery chute 505A on one side. When the discharge into other recovery chute 505B or 505C is determined, the waste plastic 501 is discharged into the recovery chute 505B or 505C by the compressed air injection nozzle 503Y or 503Z. The waste plastic 501 having not been discharged into the recovery chutes 505A to 505C drops into the recovery chute 505D from the downstream end of the conveyor 502 to be recovered.

As shown in FIG. 32, the lower nozzle 503a of the compressed air injection nozzle 503X is provided at a position close to the conveying surface 502a of the conveyor 502, and on the other hand, the upper nozzle 503A is provided at a position higher than the lower nozzle 503a. Further, the upper nozzle 503A is provided close to a travel guide 514 than the lower nozzle 503a is. Thus, the distance from the upper nozzle 503A to the article on the conveying surface 502a of the conveyor 502 is shorter than the distance from the lower nozzle 503*a* to the article. The positional relationship of nozzles is the same for the relationship between the upper nozzle 503B, 503C and the lower nozzle 503*b*, 503*c* in the compressed air injection nozzles 503Y and 503Z (not shown). In the above-described embodiment, a difference in distance between the upper nozzle 503A and the lower nozzle 503*a* is set at 50 mm, but the difference may be set depending on the situation.

Based on the inspection result of the waste plastics property inspection sensor 508, the electromagnetic valve 504A is released, and thus compressed air is injected from the upper nozzle 503A and the lower nozzle 503*a*. Then, the jet of air received by the waste plastic 501 is made in a combined state of an air flow having a high flow velocity though in a narrow region and an air flow ranging in a wide region though having a slow flow velocity by the difference in position between the upper nozzle 503A and the lower nozzle 503*a*. The waste plastic 501 often has an unfixed shape, sometimes being flat or sometimes being bent. In the case where the waste plastic 501 has such a shape, if the air flow is capable of covering only a narrow region though having a high flow velocity, a sufficient discharging force cannot given to the waste plastic 501, or sometimes the waste plastic 501 is attracted to the conveyor 502 and is not discharged because a high-velocity air flow goes between the conveyor 502 and the waste plastic 501. According to the present invention, however, the compressed air injected from the lower nozzle 503*a* that is far distant from the travel guide 514 has began to have a spread and also a decreased flow velocity, so that a problem in that the waste plastic 501 is attracted to the conveyor 502 does not occur. Further, by the spread air flow, even a flat-shaped waste plastic 501 can be caused to float upward like a kite by catching the air flow. As a result, the floating waste plastic 501 is pushed by the air flow coming from the upper nozzle 503A (this air flow has a higher flow velocity than the air flow coming from the lower nozzle 503*a*), and therefore is discharged surely into the recovery chute 505A.

In the above-described embodiment, the compressed air discharged from the electromagnetic valve 504A is separated into two compressed air supply pipes 512 to be supplied to the upper nozzle 503A and the lower nozzle 503*a*. However, needless to say, the same effect can be achieved even if a dedicated electromagnetic valve is mounted to each of the upper nozzle 503A and the lower nozzle 503*a*.

Also, the same effect can be achieved even if an air flow having a low flow velocity in a wide range is formed by a difference in nozzle shape between the upper nozzle 503A and the lower nozzle 503*a*.

Also, the same effect can be achieved even if the upper nozzle 503A and the lower nozzle 503*a* are formed integrally, and the compressed air injection port is changed in upper and lower positions.

Next, an example will be described in which the compressed air injection time of the compressed air injection nozzle is set so that the time increases toward the downstream side in the article conveying direction according to the present invention, by which waste plastics are sorted by plastic category such as PET, PE, PP, and PVC.

A device for identifying the category of waste plastic has a light source for radiating near infrared rays to the waste plastic and a light intercepting element for detecting transmitted or reflected light from the waste plastic of the radiated light. Also, the device includes a near infrared rays identifying device for identifying the material by the absorbance of a particular wavelength of the waste plastic and a sorting device which is controlled by the identifying device, and identifies the category of waste plastic on a conveying device. In this example, the category of waste plastic is detected by the above-described device, and by utilizing the result, the injection timing of compressed air injection nozzle is determined.

In order to sort waste plastics by category, the compressed air injection time of the compressed air injection nozzle is set so as to increase toward the downstream side in the article conveying direction, by which the waste plastics are sorted in the ascending order of specific gravity from the upstream side to the downstream side. Specifically, PET, which has the smallest specific gravity, is recovered by the recovery chute 505A, and then waste plastics having a larger specific gravity than that of PET, such as PE, PP, and PVC, are recovered on the downstream side. In this case, since the compressed air injection time of the compressed air injection nozzle is longer toward the downstream side, even waste plastic having a large specific gravity can be recovered surely. Further, on the downstream side, since PET has been recovered on the downstream side (recovery chute 505A), the number of waste plastics decreases as compared with the number of waste plastics at the time when waste plastics are fed from the supply device 511. Therefore, a possibility that a space is provided between the waste plastics is high, and thus the efficiency of blowing by the injection of compressed air increases, so that waste plastics having a large specific gravity can be discharged surely.

What is claimed is:

1. A waste plastics separator comprising:
   first alignment means for arranging waste plastics in a row in a lengthwise direction of the waste plastics;
   charging means for charging the waste plastics into said first alignment means;
   second alignment means for selecting and eliminating waste plastics which are not arranged in a row by said first alignment means;
   detection means for detecting the waste plastics arranged in the row by said second alignment means;
   sorting means for sorting the waste plastics arranged in the row by said second alignment means;
   sorting control means for controlling a sorting operation carried out by said sorting means according to information detected by said detection means;
   said first alignment means comprising:
      a conveyor arranged so as to be tilted in a width direction;
      a travel guide provided along a lower side of said conveyor tilted in the width direction; and
      arranging means for arranging waste plastics, which are conveyed on the conveyor, in the row in the lengthwise direction,
      said arranging means comprising a rope-like element which is stretched over the conveyor in a range from a waste plastics charging portion of the conveyor into which the waste plastics are charged by said charging means to a side end portion of said second alignment means of the conveyor;
      said rope-like element being arranged so that a clearance between said rope-like element and said travel guide increases in the range from the waste plastics charging portion to the side end portion of said second alignment means;
      said rope-like element being further arranged in a range from a starting point to the side end portion of said second alignment means;

said starting point being positioned between the side end portion of said second alignment means and a middle position between said waste plastics charging portion and the side end portion of said second alignment means; and said rope-like element being stretched in a direction so as to be separated from the conveyor to form a Y-shaped rope-like element.

* * * * *